US008011363B2

(12) United States Patent
Johnson

(10) Patent No.: US 8,011,363 B2
(45) Date of Patent: Sep. 6, 2011

(54) EXHALATION VALVE FOR USE IN A BREATHING DEVICE

(76) Inventor: Mark Johnson, Sandy, UT (US)

( * ) Notice: Subject to any disclaimer, the term of this patent is extended or adjusted under 35 U.S.C. 154(b) by 1449 days.

(21) Appl. No.: 11/437,113

(22) Filed: May 18, 2006

(65) Prior Publication Data

US 2006/0272637 A1 Dec. 7, 2006

Related U.S. Application Data

(63) Continuation-in-part of application No. 10/453,462, filed on Jun. 3, 2003, now Pat. No. 7,793,656, said application No. 11/437,113.

(60) Provisional application No. 60/385,327, filed on Jun. 3, 2002, provisional application No. 60/683,477, filed on May 21, 2005, provisional application No. 60/728,193, filed on Oct. 19, 2005.

(51) Int. Cl.

| | |
|---|---|
| ***B63C 11/02*** | (2006.01) |
| ***B63C 11/16*** | (2006.01) |
| ***B63C 11/10*** | (2006.01) |
| ***F16K 31/12*** | (2006.01) |
| ***F16K 15/00*** | (2006.01) |
| ***F16K 15/14*** | (2006.01) |

(52) U.S. Cl. .............. 128/201.11; 128/200.29; 405/186; 405/187; 137/510; 137/512.15; 137/854

(58) Field of Classification Search ............. 128/200.29, 128/201.11; 405/185, 186, 187; 137/510, 137/512.15, 854

See application file for complete search history.

(56) References Cited

U.S. PATENT DOCUMENTS

| | | | |
|---|---|---|---|
| 2,859,771 | A | 11/1958 | Blagg |
| 3,473,561 | A | 10/1969 | Svenson et al. |
| 3,860,042 | A | 1/1975 | Green |
| 3,911,949 | A | 10/1975 | Hilden et al. |
| 3,949,780 | A | 4/1976 | Buckman |
| 3,993,060 | A | 11/1976 | Mitchell |
| 4,032,106 | A | 6/1977 | Schieser et al. |
| 4,066,077 | A | 1/1978 | Shamlian |

(Continued)

FOREIGN PATENT DOCUMENTS

GB 1357249 6/1974

(Continued)

OTHER PUBLICATIONS

U.S. Appl. No. 10/453,462, filed Jun. 3, 2003, Johnson.

(Continued)

*Primary Examiner* — Patricia M Bianco
*Assistant Examiner* — Nihir Patel
(74) *Attorney, Agent, or Firm* — Maschoff Gilmore & Israelsen

(57) ABSTRACT

An underwater breathing device, such as a snorkel, may include an exhalation valve. The exhalation valve is configured to produce positive end-expiratory pressure in the airway of a user of the underwater breathing device in order to reduce the overall work of underwater breathing. The exhalation valve includes a plate defining an exhalation port. The exhalation valve also includes a flexible membrane that is sealable against a surface of the plate and is sized and positioned to be capable of sealing the exhalation port. The flexible membrane is configured to have a sealed position in which the flexible membrane seals the exhalation port such that substantially no exhaled air escapes the snorkel. The flexible membrane is also configured to have an unsealed position in which exhaled air escapes the snorkel.

28 Claims, 26 Drawing Sheets

U.S. PATENT DOCUMENTS

| | | | |
|---|---|---|---|
| 4,071,024 | A | 1/1978 | Blanc |
| 4,137,935 | A | 2/1979 | Snowdon |
| 4,143,853 | A | 3/1979 | Abramson |
| 4,230,240 | A | 10/1980 | Laauwe |
| 4,278,080 | A | 7/1981 | Schuch |
| 4,344,427 | A | 8/1982 | Marvin |
| 4,523,610 | A | 6/1985 | Orrico |
| 4,562,836 | A | 1/1986 | Perron |
| 4,610,246 | A | 9/1986 | Delphia |
| 4,655,212 | A | 4/1987 | Delphia |
| 4,708,135 | A | 11/1987 | Arkema |
| 4,731,075 | A | 3/1988 | Gallo Mezo et al. |
| 4,782,830 | A | 11/1988 | Forman |
| 4,793,341 | A | 12/1988 | Arasmith |
| 4,805,610 | A | 2/1989 | Hunt |
| 4,832,013 | A | 5/1989 | Hartdom |
| 4,834,084 | A | 5/1989 | Walsh |
| 4,860,739 | A | 8/1989 | Vandepol |
| 4,862,903 | A | 9/1989 | Campbell |
| 4,872,453 | A | 10/1989 | Christianson |
| 4,877,022 | A | 10/1989 | Christianson |
| 4,878,491 | A | 11/1989 | McGilvray, III |
| 4,879,995 | A | 11/1989 | Christianson |
| 4,884,564 | A | 12/1989 | Lamont |
| 4,896,664 | A | 1/1990 | Harayama |
| 4,907,582 | A | 3/1990 | Meyerrose |
| 4,938,259 | A | 7/1990 | Schmidt |
| 4,946,133 | A | 8/1990 | Johnson et al. |
| 5,020,191 | A | 6/1991 | Uke |
| 5,101,818 | A | 4/1992 | Chace |
| 5,117,817 | A | 6/1992 | Lin |
| 5,129,426 | A | 7/1992 | Boehmer |
| 5,143,059 | A | 9/1992 | Delphia |
| 5,199,422 | A | 4/1993 | Rasocha |
| 5,231,982 | A | 8/1993 | Harrison et al. |
| 5,245,997 | A | 9/1993 | Bartos |
| 5,261,396 | A | 11/1993 | Faulconer et al. |
| 5,265,591 | A | 11/1993 | Ferguson |
| 5,267,556 | A | 12/1993 | Feng |
| 5,271,432 | A | 12/1993 | Gueret |
| 5,280,785 | A | 1/1994 | Fujima |
| 5,297,545 | A | 3/1994 | Infante |
| 5,327,849 | A | 7/1994 | Miller |
| 5,357,654 | A | 10/1994 | Hsing-Chi |
| 5,381,563 | A | 1/1995 | Isabelle et al. |
| 5,398,673 | A | 3/1995 | Lambert |
| 5,404,872 | A | 4/1995 | Choi |
| 5,487,379 | A | 1/1996 | Koshiishi |
| 5,518,026 | A | 5/1996 | Benjey |
| 5,529,057 | A | 6/1996 | Ferrero |
| 5,606,967 | A | 3/1997 | Wang |
| 5,622,165 | A | 4/1997 | Huang |
| 5,638,811 | A | 6/1997 | David |
| 5,657,746 | A | 8/1997 | Christianson |
| 5,664,558 | A * | 9/1997 | Wagner .................... 128/201.11 |
| 5,671,728 | A | 9/1997 | Winefordner |
| 5,697,362 | A | 12/1997 | Albrecht |
| 5,791,524 | A | 8/1998 | Demarest |
| 5,865,169 | A | 2/1999 | Lan et al. |
| 5,868,129 | A * | 2/1999 | Christianson ............ 128/201.11 |
| D406,333 | S | 3/1999 | Garraffa |
| 5,893,362 | A | 4/1999 | Evans |
| 5,906,199 | A | 5/1999 | Budzinski |
| 5,924,416 | A | 7/1999 | Miller |
| 5,937,850 | A | 8/1999 | Kawashima et al. |
| 5,947,116 | A | 9/1999 | Gamow |
| 5,960,791 | A | 10/1999 | Winefordner |
| 6,059,157 | A | 5/2000 | Parsons et al. |
| 6,073,626 | A | 6/2000 | Riffe |
| 6,079,410 | A | 6/2000 | Winefordner et al. |
| 6,085,744 | A | 7/2000 | Hermansen et al. |
| 6,119,685 | A | 9/2000 | Kawashima |
| 6,123,320 | A | 9/2000 | Rasanow et al. |
| 6,129,081 | A | 10/2000 | Wu |
| 6,129,116 | A | 10/2000 | Laskowski |
| 6,202,644 | B1 | 3/2001 | Takeuchi |
| 6,240,962 | B1 | 6/2001 | Tai et al. |
| 6,273,046 | B1 | 8/2001 | Pierce |
| 6,276,362 | B1 | 8/2001 | Chen-Lieh |
| 6,302,102 | B1 | 10/2001 | Giroux |
| 6,318,363 | B1 | 11/2001 | Monnich |
| 6,352,075 | B1 | 3/2002 | Wang |
| 6,363,929 | B1 | 4/2002 | Winefordner |
| 6,371,108 | B1 | 4/2002 | Christianson |
| 6,394,417 | B1 | 5/2002 | Browne |
| 6,401,711 | B1 | 6/2002 | Tibbs |
| 6,435,178 | B1 | 8/2002 | Lin |
| 6,478,024 | B1 | 11/2002 | White |
| 6,513,520 | B2 | 2/2003 | Vinokur et al. |
| 6,655,378 | B2 | 12/2003 | Swetish |
| 6,709,604 | B2 | 3/2004 | Tai et al. |
| 6,736,136 | B2 | 5/2004 | Chen-Lieh |
| 6,827,105 | B1 | 12/2004 | Marble et al. |
| 6,883,780 | B2 | 4/2005 | Browne et al. |
| 6,908,210 | B2 | 6/2005 | Kuo |
| 6,915,801 | B2 | 7/2005 | Pokras |
| 7,182,093 | B2 | 2/2007 | Call et al. |
| 7,185,796 | B2 | 3/2007 | Parsons |
| 2002/0088460 | A1 | 7/2002 | Monnich |
| 2002/0170558 | A1 | 11/2002 | Vinokur |
| 2003/0029448 | A1 | 2/2003 | Swetish |
| 2003/0037783 | A1 | 2/2003 | Feng |
| 2004/0035414 | A1 | 2/2004 | Johnson |
| 2005/0034726 | A1 | 2/2005 | Pittaway et al. |
| 2006/0102176 | A1 | 5/2006 | Junck |
| 2006/0272637 | A1 | 12/2006 | Johnson |

FOREIGN PATENT DOCUMENTS

| | | |
|---|---|---|
| GB | 1434835 | 5/1976 |
| GB | 2171781 | 9/1986 |
| GB | 2313317 | 11/1997 |
| JP | 10-299922 | 11/1998 |
| JP | 2002-154480 | 5/2002 |
| JP | 2004-169748 | 6/2004 |
| TW | 573667 | 1/2004 |
| TW | M248730 | 11/2004 |
| TW | M252649 | 12/2004 |
| WO | WO 2006/042063 | 4/2006 |
| WO | WO 2006/127556 | 11/2006 |
| WO | WO 2006/127557 | 11/2006 |

OTHER PUBLICATIONS

U.S. Appl. No. 11/244,522, filed Oct. 6, 2005, Johnson.

U.S. Appl. No. 11/248,900, filed Oct. 11, 2005, Johnson.

U.S. Appl. No. 11/923,423, filed Oct. 24, 2007, Johnson.

Fee et al., "Cardiorespiratory responses to increased resistance during exercise," Lung Mechanics, 5032.

Ellingsen, "The influence on the breathing pattern in man of moderate levels of continuous positive and negative airway pressure and of positive end-expiratory pressure during air and $CO_2$ inhalation," ACTA Physiol Scand 1990, 138, 273-282.

Van Der Shans, "Effect of positive expiratory pressure on breathing pattern in healthy subjects," Eur Respir J, 1993, 6, 60-66.

Layon et al., "Continuous positive airway pressure and expiratory positive airway pressure increase functional residual capacity equivalently," CHEST, 89/4/Apr. 1986, p. 517.

Tobin et al., "Effect of positive end-expiratory pressure on breathing patterns of normal subjects and intubated patients with respiratory failure," Critical Care Medicine, 1983, p. 859, vol. 11-No. 11, Williams & Wilkins Co.

Savourey et al., "Positive end expiratory pressure (PEEP) slightly modifies ventilatory response during incremental exercise," Aviation, Space and Environmental Medicine, Jan. 2001, p. 21, vol. 72-No. 1.

Muller, "A field study of the ventilatory response to ambient temperature and pressure in sport diving," Br. J. Sports Med., 1995, vol. 29, No. 3, p. 185-190, Butterworth Heinemann.

Office Action dated Sep. 11, 2007 from U.S. Appl. No. 10/453,462, 13 pages.

Office Action dated Feb. 23, 2006 from U.S. Appl. No. 10/453,462, 11 pages.

Office Action dated Jun. 23, 2005 from U.S. Appl. No. 10/453,462, 13 pages.

Office Action dated Mar. 21, 2005 from U.S. Appl. No. 10/453,462, 5 pages.

Office Action dated Oct. 17, 2007 from U.S. Appl. No. 11/244,522, 8 pages.
Office Action dated May 24, 2007 from U.S. Appl. No. 11/244,522, 5 pages.
International Search Report from PCT/US2005/036072 dated Dec. 8, 2006, 2 pages.
International Preliminary Report on Patentability from PCT/US2005/036072 dated Apr. 11, 2007, 6 pages.
Written Opinion from PCT/US2005/036072 dated Sep. 25, 2006, 5 pages.
Office Action dated Aug. 23, 2006 from U.S. Appl. No. 11/244,522, 7 pages.
International Search Report from PCT/US2006/019658 dated Dec. 13, 2006, 2 pages.
International Preliminary Report on Patentability from PCT/US2006/019658 dated Nov. 23, 2007, 4 pages.
Written Opinion from PCT/US2006/019658 dated Oct. 28, 2006, 3 pages.
International Search Report from PCT/US2006/019659 dated Jul. 27, 2007, 2 pages.
International Preliminary Report on Patentability from PCT/US2006/019659 dated Nov. 23, 2007, 5 pages.
Written Opinion from PCT/US2006/019659 dated May 29, 2007, 4 pages.
International Search Report and Written Opinion from PCT/US2008/054475, dated Aug. 15, 2008, 11 pages.
U.S. Appl. No. 12/034,617, filed Feb. 20, 2008, Johnson.
International Search Report and Written Opinion from PCT/US2007/082520, dated May 7, 2008, 10 pages.
Search Report from Taiwan Application No. 095118125, dated Feb. 18, 2008, 1 page.
Office Action from Chinese Patent Application No. 2006800176981, dated Apr. 24, 2009, 9 pages.
Office Action from Australian Patent Application No. 2006251592, dated May 7, 2009, 1 page.
Office Action from Australian Patent Application No. 2006251593, dated May 19, 2009, 2 pages.
Examination Report for Singapore Patent Application No. 200717891-6, dated Jan. 29, 2009, 5 pages.
International Preliminary Report on Patentability from PCT/US0228/054475, dated Aug. 26, 2009, 8 pages.
Examination Report from Canadian Patent Application No. 2,609,479, dated Aug. 27, 2009, 4 pages.
Examination Report from Canadian Patent Application No. 2,609,204 dated Sep. 23, 2009, 2 pages.
Examination Report from New Zealand Patent Application No. 563367 dated Aug. 18, 2009, 2 pages.
Examination Report from New Zealand Patent Application No. 563368 dated Aug. 19, 2009, 2 pages.
European Search Report from EPO Patent Application No. 06770786.9 dated Aug. 5, 2009, 6 pages.
Office Action from U.S. Appl. No. 11/248,900 dated Oct. 16, 2009, 6 pages.
Notice of Allowability from U.S. Appl. No. 11/244,522, dated May 14, 2010.
Notice of Allowability from U.S. Appl. No. 10/453,462, dated May 14, 2010.
Office Action dated Jul. 12, 2010 from U.S. Appl. No. 11/248,900.
Office Action dated Oct. 4, 2010 from U.S. Appl. No. 12/034,617.
Office Action dated Jan. 20, 2011 from U.S. Appl. No. 11/923,423.
Notice of Allowance dated Apr. 19, 2011 from U.S. Appl. No. 12/034,617.
Examination Report dated Mar. 11, 2011 from New Zealand Application No. 563367.
Examination Report dated Mar. 14, 2011from New Zealand Application No. 563368.

* cited by examiner

EXHALATION VALVE FOR USE IN A BREATHING DEVICE

CROSS REFERENCE TO RELATED APPLICATIONS

This application is a continuation-in-part of U.S. patent application Ser. No. 10/453,462, entitled "Underwater Breathing Devices And Methods," filed on Jun. 3, 2003, now U.S. Pat. No. 7,793,656 which claims priority to and the benefit of U.S. provisional patent application Ser. No. 60/385,327, filed Jun. 3, 2002. This application also claims priority to and the benefit of U.S. provisional patent application Ser. No. 60/683,477, entitled "Valves, Baffles, Shortened Snorkels, Stealth Snorkels, Snorkel Equipment Combined with Scuba Equipment," which was filed on May 21, 2005. This application also claims priority to and the benefit of U.S. provisional patent application Ser. No. 60/728,193, entitled "Snorkel Valve," which was filed on Oct. 19, 2005. Each of these applications is hereby expressly incorporated by reference herein in its entirety.

BACKGROUND OF INVENTION

1. Field of Invention

The present invention relates generally to an underwater breathing device and, in particular, to an exhalation valve for use in an underwater breathing device that is configured to produce positive end-expiratory pressure in the airway of a user.

2. Description of Related Art

An underwater breathing device enables a user to continue breathing even after the user's mouth and/or nose is submerged in water. Some underwater breathing devices, such as scuba and snuba breathing devices, are configured to provide a submerged user with air from a compressed-air container. Other underwater breathing devices, such as a conventional snorkel, are configured to provide a user with air from the atmosphere.

A conventional snorkel generally includes a breathing conduit through which air can be inhaled from the atmosphere. The breathing conduit is typically configured with two ends. One end of the snorkel is intended to remain above the surface of the water. The other end of the snorkel is intended to be submerged under the surface of the water. The end of the inhalation conduit that is intended to be submerged generally includes a mouth piece. In practice the user inserts a portion of the mouthpiece into his mouth and thereby creates a seal between the user's airway and the breathing conduit. The user then submerges his mouth and the mouthpiece under water while maintaining the other end of the breathing conduit above the surface of the water, thereby enabling the user to inhale atmospheric air while submerged in water. At the same time, the breathing conduit enables the user to exhale through the user's mouth without breaking the seal between the user's mouth and the mouth piece. Generally, the air exhaled by a user exits the snorkel through the same breathing conduit through which the user inhales atmospheric air.

One problem that a user can encounter while using a conventional snorkel is increased fatigue due to the compressive forces of the ambient water in which the user is submerged. During normal inhalation and exhalation, a user expends effort inflating and deflating his lungs. When a user is submerged in water, however, the compressive forces of the ambient water around the user's lungs force the user to expend more effort than usual in order to inflate his lungs and tend to cause the user to expend less effort than usual to deflate his lungs. This reduced-effort exhalation tends to cause a user to exhale faster that normal such that there is less time between each increased effort-inhalation, resulting in more frequent inhalation. More frequent inhalation can cause the user to fatigue more quickly than during normal inhalation and exhalation, which can result in difficulty breathing due to a smaller functional lung capacity and the possibility of atelectasis, which is a failure of the lungs to expand completely.

Another problem that a user can encounter while using a conventional snorkel is difficulty breathing due to water being present in the breathing conduit of the snorkel. Water can sometimes enter a conventional snorkel through one or both ends of the breathing conduit. This water can cause difficulty breathing when it accumulates to the point where the water interferes with the passage of air in the breathing conduit and/or the water is inhaled by the user. In addition, the presence of water in the breathing conduit of the snorkel can cause a distracting gurgling or bubbling noise as air passes by the water during inhalation and/or exhalation.

BRIEF SUMMARY OF INVENTION

A need therefore exists for an underwater breathing device that eliminates or reduces some or all of the above-described problems.

One aspect is an exhalation valve that may be used in an underwater breathing device. The exhalation valve is potentially configured to produce positive end-expiratory pressure in the airway of a user of the underwater breathing device in order to reduce the overall work of underwater breathing. The exhalation valve may include a plate defining at least one chamber port and an exhalation port. The at least one chamber port may be positioned opposite the exhalation port. The exhalation valve may also include a flexible membrane that is sealable against a surface of the plate and is sized and positioned to be capable of sealing the exhalation port. The flexible membrane may be configured to have a sealed position in which the flexible membrane seals the exhalation port such that substantially no air can flow between the at least one chamber port and the exhalation port. The flexible membrane may also be configured to have an unsealed position in which the flexible membrane does not seal the exhalation port such that air can flow between the at least one chamber port and the exhalation port.

Another aspect is an exhalation valve that may include a plate that is substantially rigid and substantially disk-shaped. In addition, the exhalation port of the plate of the exhalation valve may be either oval-shaped or teardrop-shaped. Further, the flexible membrane of the exhalation valve may include a hinged region positioned so as to divide the exhalation port into two sides such that, when the flexible membrane bends along the hinged region, one side can become unsealed while the other side remains sealed. Moreover, the plate and/or the flexible membrane of the exhalation valve may have a nub formed thereon that is positioned between the plate and the flexible membrane.

Yet another aspect is an underwater breathing device that may be configured to produce positive end-expiratory pressure in the airway of a user of the underwater breathing device. The production of positive end-expiratory pressure in the airway of a user of the underwater breathing device may reduce the overall work of underwater breathing. The underwater breathing device may include a chamber and a valve. The chamber may include first and second openings. The chamber may be configured such that when air is being exhaled through the first opening into the chamber in a manner that restricts air from simultaneously escaping through the first opening, there is no unrestricted passageway out of the chamber through which air can exit the underwater breathing device and, as a result, the exhaled air creates an exhalation pressure within the chamber. The valve may restrict airflow between the chamber and the second opening. The valve may include a plate and a flexible membrane. The plate may define the at least one chamber port and the exhalation port. The at least one chamber port may be positioned opposite the exhalation port. The second opening may include the at least one chamber port and the exhalation port. The flexible membrane may be sealable against a surface of the plate and may be sized and positioned to be capable of sealing the exhalation port. The flexible membrane may be configured such that an opening force, comprising any exhalation pressure within the chamber, biases the valve in a first direction and a closing force biases the valve in a second direction, the first direction being substantially opposite the second direction. The flexible membrane may have a closed position in which the flexible membrane seals the exhalation port such that substantially no air is released from the chamber through the exhalation port. The flexible membrane may be disposed in the closed position when the opening force is less than or equal to the closing force. The flexible membrane may also have an open position in which the flexible membrane does not seal the exhalation port such that air is released from the chamber through the exhalation port. The flexible membrane may be disposed in the open position when the opening force exceeds the closing force.

A further aspect is that an underwater breathing device may include a mouthpiece connected to the first opening. In addition, an underwater breathing device may include an exhalation conduit connected to the exhalation port. Further, an underwater breathing device may include an exhalation conduit divided by a septum which creates a first conduit and a second conduit. The second conduit is sized and positioned such that, when the underwater breathing device is in use, any water that enters the exhalation conduit tends to collect in the second conduit. Furthermore, the flexible membrane further may include a hinged region aligned with the septum such that, when the flexible membrane bends along the hinged region, the first conduit can become unsealed while the second conduit remains sealed. Moreover, the opening force required to bend the flexible membrane at the hinged region of the flexible membrane and thereby only unseal the first conduit is less than the opening force required to bend the flexible membrane such that both the first and the second conduits are unsealed. In addition, the closing force may include ambient water pressure when at least a portion of the underwater breathing device is submerged in water. Further, the opening force further may include a force created by a tension of an elastic string attached to the flexible membrane which biases the flexible membrane in substantially the first direction. Moreover, the tension of the elastic string, and the resulting opening force, may be manually adjustable.

Yet another aspect is an underwater breathing device configured to produce positive end-expiratory pressure in the airway of a user of the underwater breathing device. The positive end-expiratory pressure in the airway of the user may reduce the overall work of underwater breathing. The underwater breathing device may include a chamber and a valve. The chamber may include first and second openings. The chamber is preferably configured such that when air is being exhaled through the first opening into the chamber in a manner that restricts air from simultaneously escaping through the first opening, there is no unrestricted passageway out of the chamber through which air can exit the underwater breathing device and, as a result, the exhaled air creates an exhalation pressure within the chamber. The valve may function to restrict airflow between the chamber and the second opening. The valve may be configured such that any exhalation pressure within the chamber biases the valve in a first direction and a counter pressure biases the valve in a second direction. The first direction may be substantially opposite the second direction. The valve may have a closed position in which substantially no air is released from the chamber through the second opening. The valve can be disposed in the closed position when any exhalation pressure within the chamber is less than or equal to the counter pressure. The valve may also have an open position in which at least some air is released from the chamber through the second opening. The valve can be disposed in the open position when any exhalation pressure within the chamber exceeds the counter pressure.

Still another aspect is an underwater breathing device that includes a mouthpiece connected to the first opening. In addition, an underwater breathing device may include an exhalation conduit connected to the second opening. Also, the counter pressure may include ambient water pressure when at least a portion of the underwater breathing device is submerged in water. Further, the counter pressure may also include one or more springs. Moreover, an underwater breathing device may also include a chamber with a third opening and where the valve further restricts airflow between the chamber and the third opening. The valve can further include a purge position in which at least some air is released from the chamber through the second opening and the third opening. The valve may be disposed in the purge position when any exhalation pressure within the chamber is distinctly greater than the counter pressure.

These and other aspects, features and advantages of the present invention will become more fully apparent from the following detailed description of preferred embodiments.

BRIEF DESCRIPTION OF DRAWINGS

The appended drawings contain figures of preferred embodiments to further clarify the above and other aspects, advantages and features of the present invention. It will be appreciated that these drawings depict only preferred embodiments of the invention and are not intended to limit its scope. The invention will be described and explained with additional specificity and detail through the use of the accompanying drawings in which.

DETAILED DESCRIPTION OF PREFERRED EMBODIMENTS

This invention is generally directed towards an exhalation valve for use in an underwater breathing device. The exhalation valve that is configured to produce positive end-expiratory pressure in the airway of a user of the underwater breathing device. The principles of the present invention, however, are not limited to underwater breathing devices. It will be understood that, in light of the present disclosure, the structures disclosed herein can be successfully used in connection with any device that is intended to produce positive end-expiratory pressure in the airway of a user.

Additionally, to assist in the description of the exhalation valve, words such as top, bottom, front, rear, right, left and side are used to describe the accompanying figures, which are not necessarily drawn to scale. It will be appreciated, however, that the present invention can be located in a variety of desired positions within an underwater breathing device or other device—including various angles, sideways and even upside down. A detailed description of the exhalation valve for use in an underwater breathing device now follows.

As discussed below and shown in the accompanying figures, the exhalation valve may be used in connection with an underwater breathing device such as a scuba or snuba regulator, or a snorkel. For example, the exhalation valve may function in connection with an inhalation valve of a snorkel, or the exhalation valve may be combined with the inhalation valve. The exhalation valve may be placed at the top or the bottom of the breathing conduit of a snorkel, whether the snorkel includes only a single breathing conduit, or includes both an inhalation conduit and an exhalation conduit. The exhalation valve is generally configured to open when the user of the snorkel exhales to allow the exhaled air to exit the snorkel. The exhalation valve is also generally configured to close when the user of the snorkel is not exhaling, as during inhalation or between breaths. Where the snorkel includes both an inhalation and an exhalation conduit, the closed exhalation valve may prevent exhaled air from the exhalation conduit from passing back into the inhalation tube, thereby channeling the exhaled air through the proper exhalation tube.

Figure 1A:
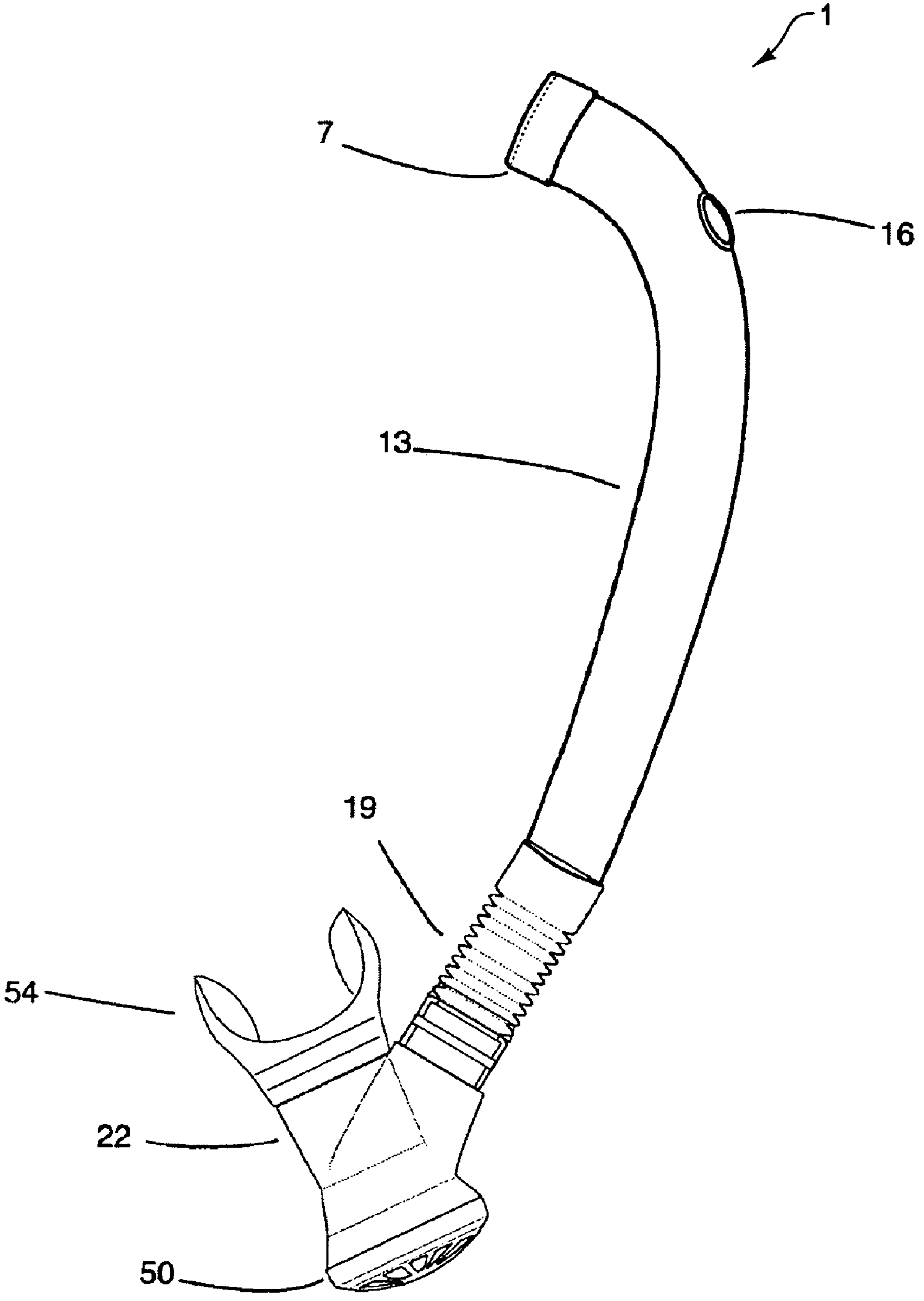
FIG. 1A is a front view of an exemplary assembled snorkel.
Figure 1B:
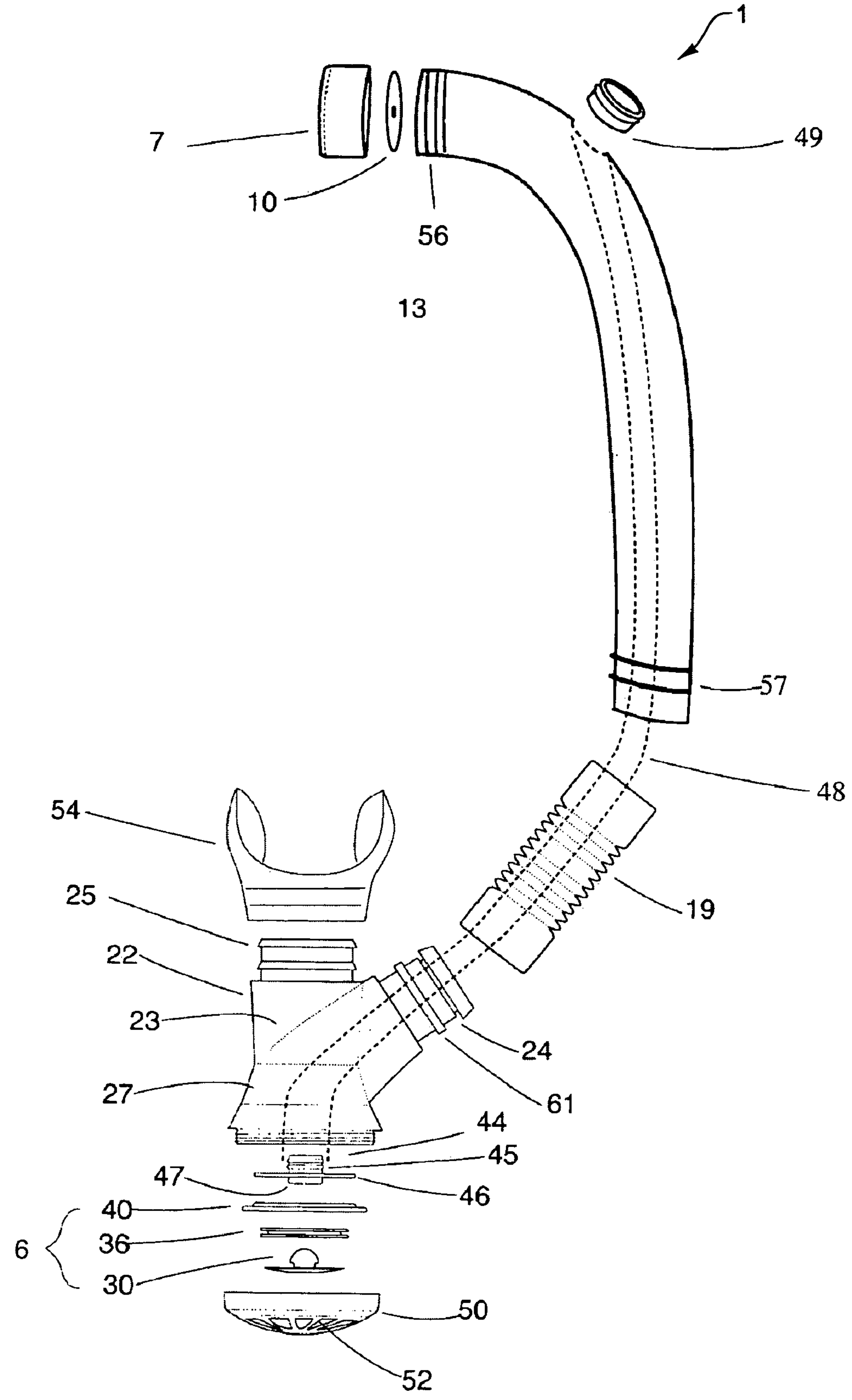
FIG. 1B is a front exploded view of the snorkel of FIG. 1A.

Turning now to FIGS. 1A and 1B, an exemplary snorkel 1 is disclosed. In general, the snorkel 1 facilitates inhalation through an inhalation conduit to the mouthpiece of the user, and exhalation goes from the mouthpiece to an exhalation conduit from which exhaled air exits the snorkel. The snorkel 1 includes an inhalation valve and an exhalation valve. The snorkel 1 also includes a purge valve which shares part of its structure with the exhalation valve. When the snorkel 1 is in use, atmospheric air flows one-way into the inhalation valve and through the inhalation conduit to the mouthpiece where it is inhaled by the user. The air that is subsequently exhaled by the user then flows through the exhalation valve and through the exhalation conduit where the exhaled air exits the snorkel. Exhaled air can also exit the snorkel 1 through the purge valve. Additional details regarding exemplary structures for the inhalation valve, the inhalation conduit, the mouthpiece, the exhalation valve, the exhalation conduit, and the purge valve now follows.

The snorkel 1 includes several major structural elements including an inhalation cap 7, a main tube 13, a connecting tube 19, a mouthpiece 54, a junction 22 which houses a chamber 23, an exhalation conduit 48, and a purge reservoir 27. At the lower end of the snorkel 1 is the purge cap 50. Near the upper end of the main tube 13 is the exhalation conduit exit port 16 where the exhaled air normally exits the snorkel 1.

In greater detail, FIG. 1B discloses the inhalation cap 7, an inhalation valve diaphragm member 10, the main tube 13, the connecting tube 19, and the junction 22. A combined sealing assembly 6 includes a combined sealing member 30, a rigid support disk 36, and a convoluted membrane 40, which serves to flexibly mount the active components of the exhalation valve which is a functional component of the combined sealing assembly 6 acting against a sealing ring 47 of an exhalation tube lower mount 44. The exhalation tube 48 mounts to the upper aspect of this structure as shown. The exhalation tube 48 then courses up the central chambers of the snorkel 1 until it mounts at its upper end by sandwiching between the main tube 13 and a hollow exhalation tube mounting plug 49. The exhalation tube lower mount 44 is connected to the junction 22 by a supporting structure 46 which on a top down view resembles spokes extending out to an outer rim. Therefore, this supporting structure 46 does not impede fluid/air movement across it, e.g., from top to bottom. The purge cap 50 screws onto the junction 22 and thereby secures the combined sealing assembly 6 where its convoluted membrane 40 attaches between these two structures. Importantly, the junction 22 houses the chamber 23 where exhalation pressure is maintained by the combination of the inhalation valve and the exhalation valve. The lower most portion of the chamber 23 within the junction 22 is referred to as the purge reservoir 27 as this is where splash/flood water would first accumulate.

Figure 2B:
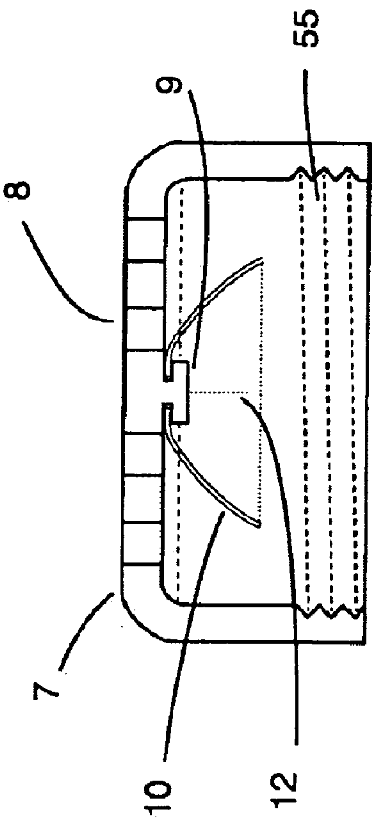
FIG. 2B is a transverse section view of the inhalation cap of the snorkel of FIGS. 1A and 1B showing the inhalation valve in open position such as occurs during inhalation.
Figure 2C:
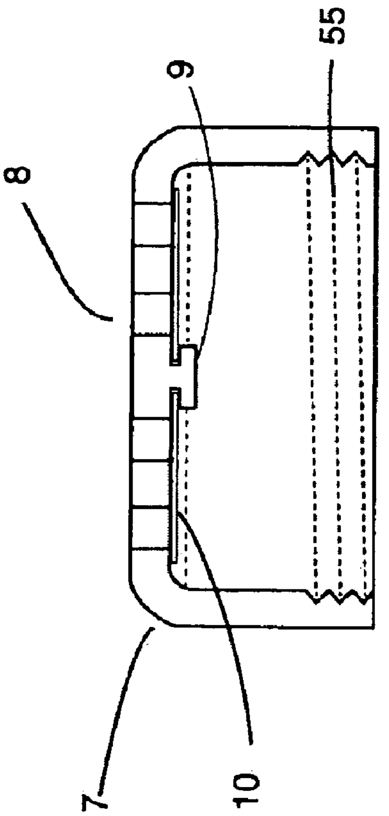
FIG. 2C is a transverse sectional view of the inhalation cap of the snorkel of FIGS. 1A and 1B showing the inhalation valve in the closed position such as occurs during breath holding or exhalation
Figure 2A:
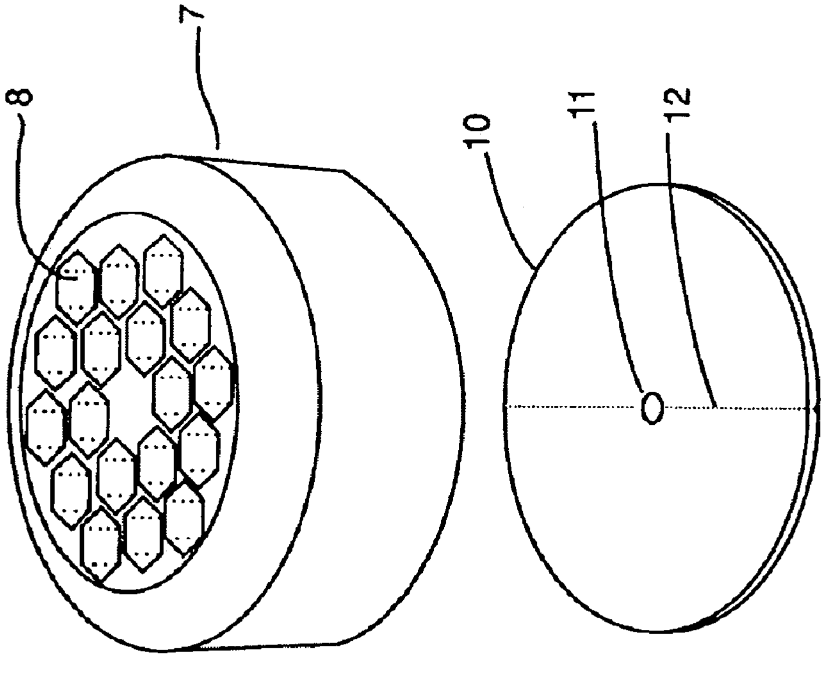
FIG. 2A is a top perspective view of the inhalation cap and the inhalation valve diaphragm member of the snorkel of FIGS. 1A and 1B, which together form an inhalation valve.

FIG. 2A shows the inhalation cap 7, some thru-passages 8, and the inhalation valve diaphragm member 10, which taken together form the inhalation valve. The inhalation valve diaphragm member 10 has an optional partial thickness groove 12 across its diameter and is centrally anchored at its central hole 11 by the inhalation valve anchor 9 that is shown in FIG. 2B and FIG. 2C.

FIG. 2B shows a transverse sectional view of the inhalation cap 7 and the deformed shape of the inhalation valve diaphragm member 10, representative of the valve in its open position as occurs during inhalation. All inhaled air passes through the thru-passages 8 of the inhalation cap 7 to enter the snorkel 1. Therefore the inhalation cap can be considered the first member of the inhalation conduit. The inhalation valve diaphragm member 10 is very flexible and easily deforms to minimize any contribution to airway resistance in the inhalation conduit. The optional partial thickness groove 12 across its diameter allows this valve to function as a more efficient butterfly-style valve. Additionally, the inhalation cap 7 is sized such that the thru-passages 8 combine in area to similarly minimize their contribution to airway resistance even at rapid inhalation flow rates. The internal threads 55 of the inhalation cap 7 are shown and mate with corresponding threads on the main tube 13 as described in FIG. 3A.

FIG. 2C is similar to FIG. 2B, but shows the inhalation valve diaphragm member 10 in its flattened shape as occurs while not inhaling. The inhalation valve diaphragm member 10 naturally, but gently, assumes this flat shape when no pressure gradient exists across the valve in order to minimize the closing sounds that would be experienced if the valve did not flatten until forcefully closed. Then, as exhalation occurs, the valve remains tightly closed as the pressure acting on the exhalation valve (described in FIGS. 6A, 6B, and 6C) at the bottom of the snorkel 1 propagates within the snorkel 1 to provide the closing pressure for this inhalation valve. As long as the snorkel 1 is generally oriented in the normal use position (i.e., with the inhalation valve higher than the exhalation valve), and the user is not actively inhaling, this pressure will be adequate to prevent water from entering the snorkel 1 via the inhalation cap 7.

Figure 3A:
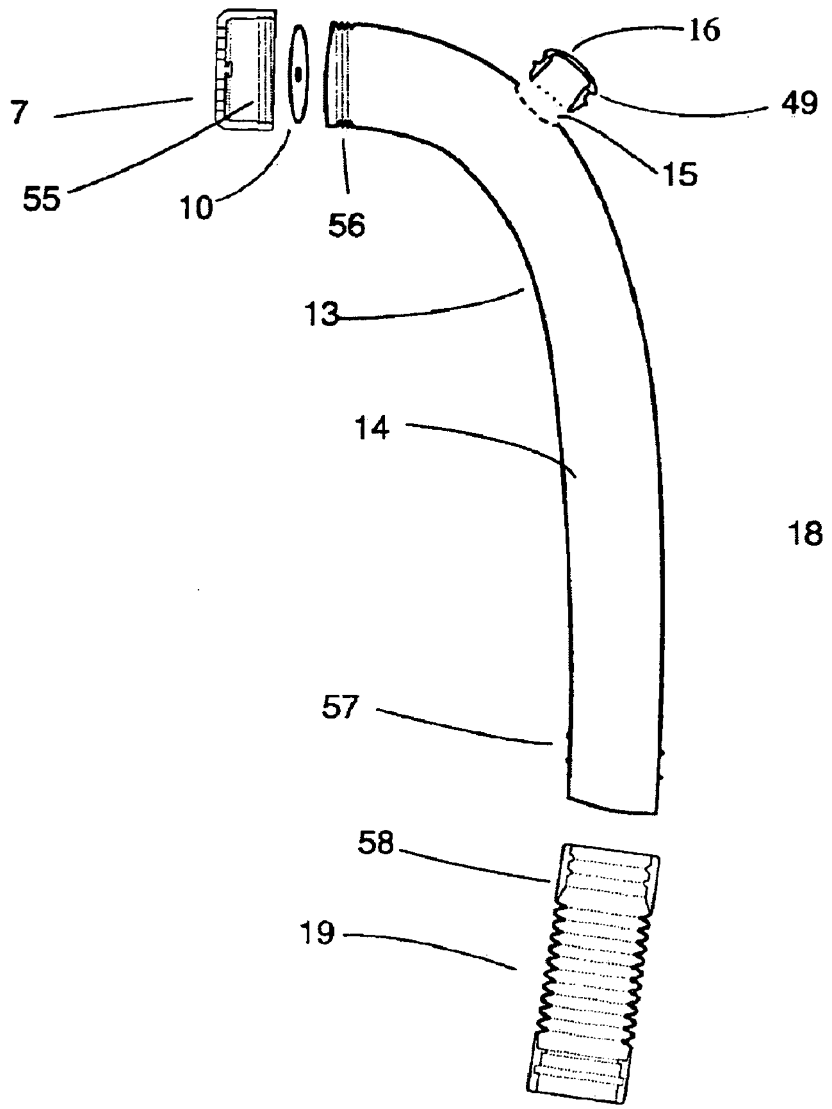
FIG. 3A is a transverse sectional view of the main tube of the snorkel of FIGS. 1A and 1B and its associated structures.

FIG. 3A shows a transverse sectional view of the main tube 13 and its related structures. The inhalation cap 7 mounts to the top end of the main tube 13 with a mating set of internal threads 55 and external threads 56 on their respective components. The represented structures of the inhalation valve are as described above for FIG. 2B and FIG. 2C. The main tube's central channel 14 directly receives inhaled air from the inhalation valve and therefore becomes the second functional member of the inhalation conduit, wherein the inhalation conduit is defined to be the network of tubes and other hollow structures through which inhaled air sequentially passes. The exhalation tube upper mount 15 is integral with the main tube 13 and provides a circular outer wall against which the upper end of the exhalation tube 48 is sandwiched by the hollow exhalation tube mounting plug 49. This design effectively eliminates a potential air leak between the exhalation conduit 48 and the inhalation conduit of the snorkel 1 that could otherwise be problematic as the exhalation conduit 48 passes through this wall of the inhalation conduit. The exhalation conduit exit port 16 is an opening in the inhalation conduit through which the exhalation conduit 48 exits the snorkel 1. The main tube 13 has an ellipsoid cross-section 17 at its lower end to reduce hydrodynamic drag while swimming and it transitions to a circular cross-section 18 at its upper end to allow the inhalation cap 7 to screw-mount. The lower end of the main tube 13 mounts to the flexible connecting tube 19 with the ribs on main tube 57 mating with the grooves in connecting tube 58.

Figure 3B:
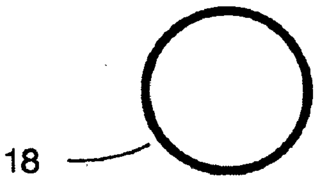
FIG. 3B shows the transverse sectional view of FIG. 3A with the exhalation tube coursing within the main tube and mounting to the main tube's exhalation tube upper mount.
Figure 3C:
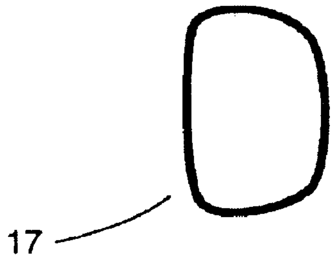
FIG. 3C shows the Ellipsoid Cross-Section of the lower end of the main tube of the snorkel of FIGS. 1A and 1B.
Figure 3D:
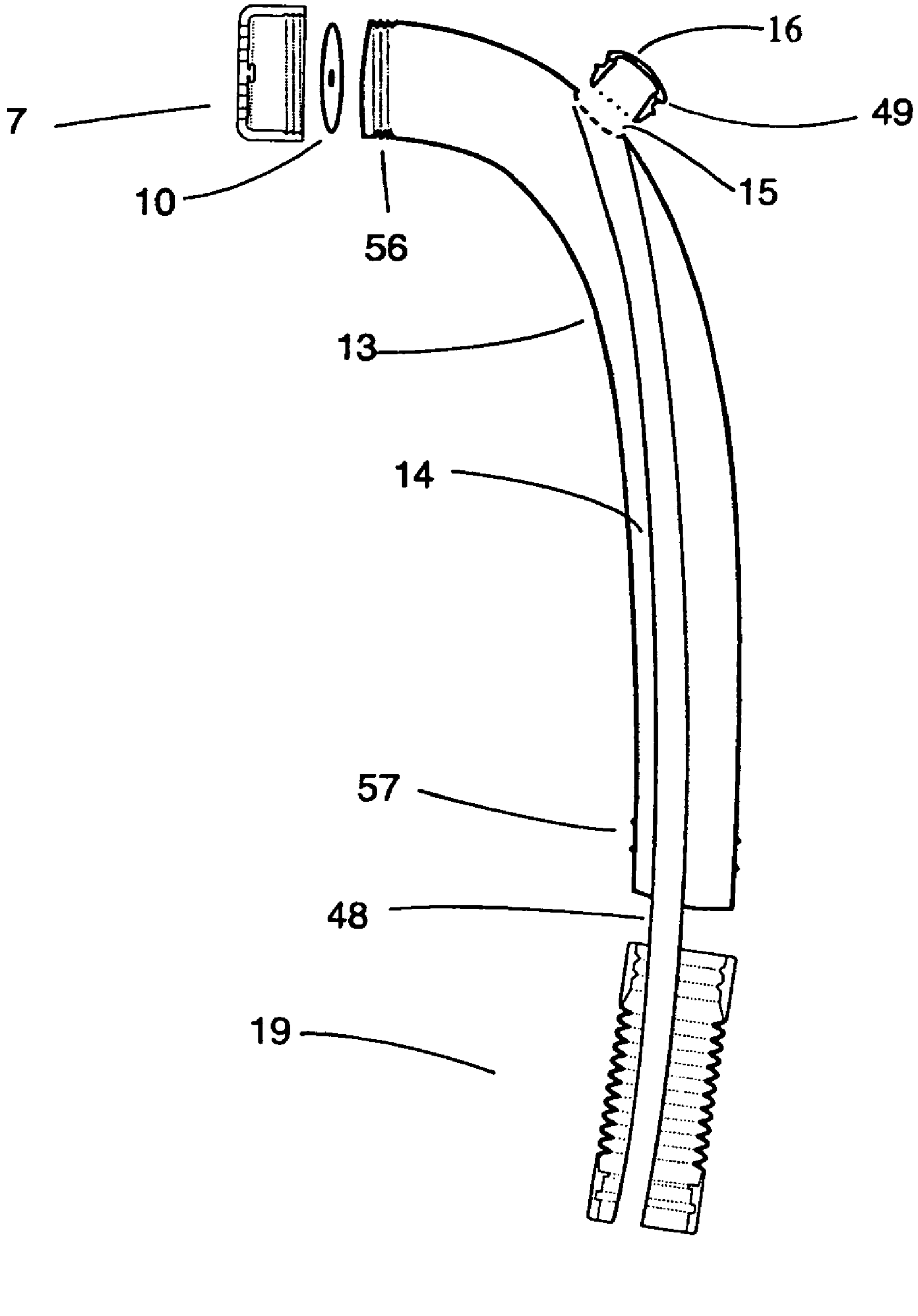
FIG. 3D is a transverse sectional view of the main tube of the snorkel of FIGS. 1A and 1B and its associated structures.

FIG. 3B shows the circular cross-section 18 of the upper end of the main tube 13 and FIG. 3C shows the ellipsoid cross-section 17 of the lower end of the main tube 13. FIG. 3D is identical to FIG. 3A except that it also shows the exhalation tube 48 as it courses through the main tube 13.

Figures 4A, 4B:
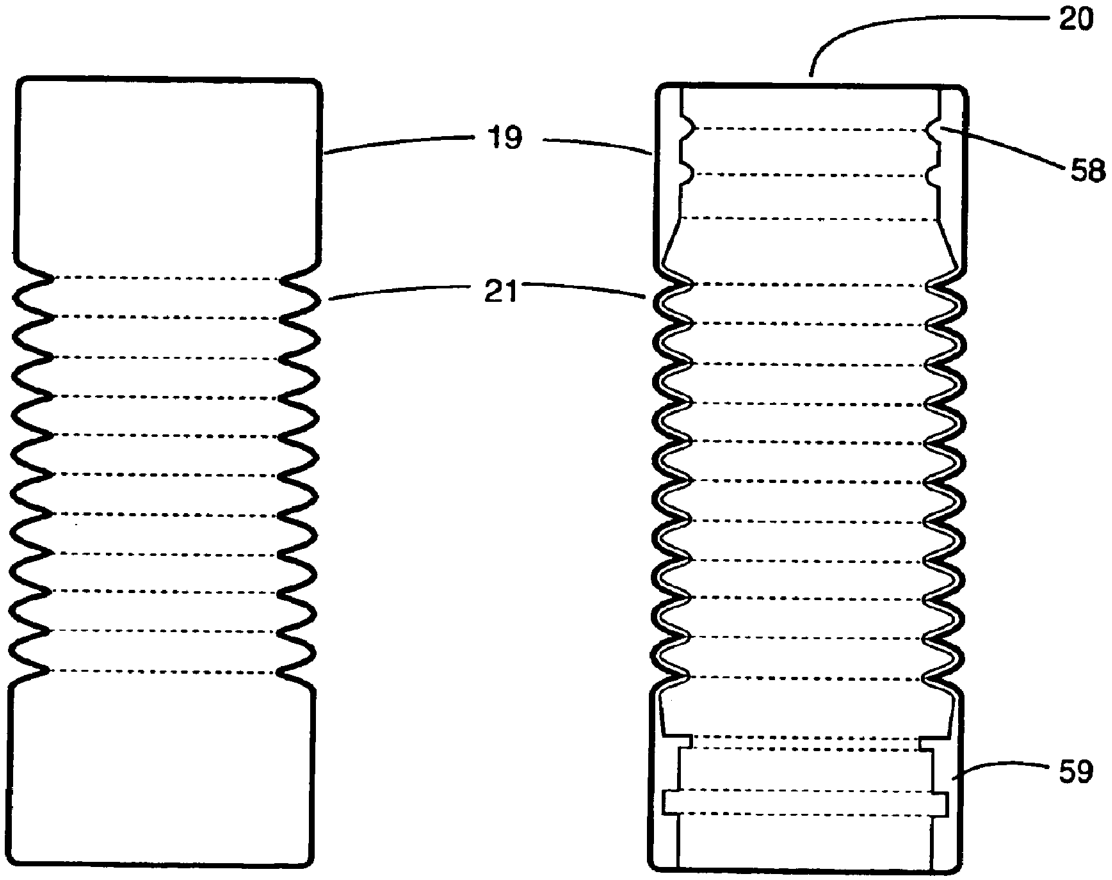
FIG. 4A is a side view of the ribbed flexible connecting tube of the snorkel of FIGS. 1A and 1B.
FIG. 4B is a sectional view of the connecting tube shown in FIG. 4A.

FIG. 4A is a side view of the ribbed flexible connecting tube 19. The outer ribs 21 provide radial support for the tube, while still allowing it to be flexible and bend. This bending provides improved comfort while the snorkel 1 is being worn, particularly if other diving gear is also concurrently being used.

FIG. 4B is a transverse sectional view of the ribbed flexible connecting tube 19 that is also described in FIG. 4A. Now shown is the central channel 20 of this tube, which is the third functional member of the inhalation conduit. Further revealed herein are the upper grooves 58 of the connecting tube 19 that mate with corresponding ribs 57 on the main tube 13 (shown in FIG. 3A) and the lower grooves 59 of the connecting tube 19 that mate with ribs 60 on the junction 22 (shown in FIG. 5A)

Figure 5A:
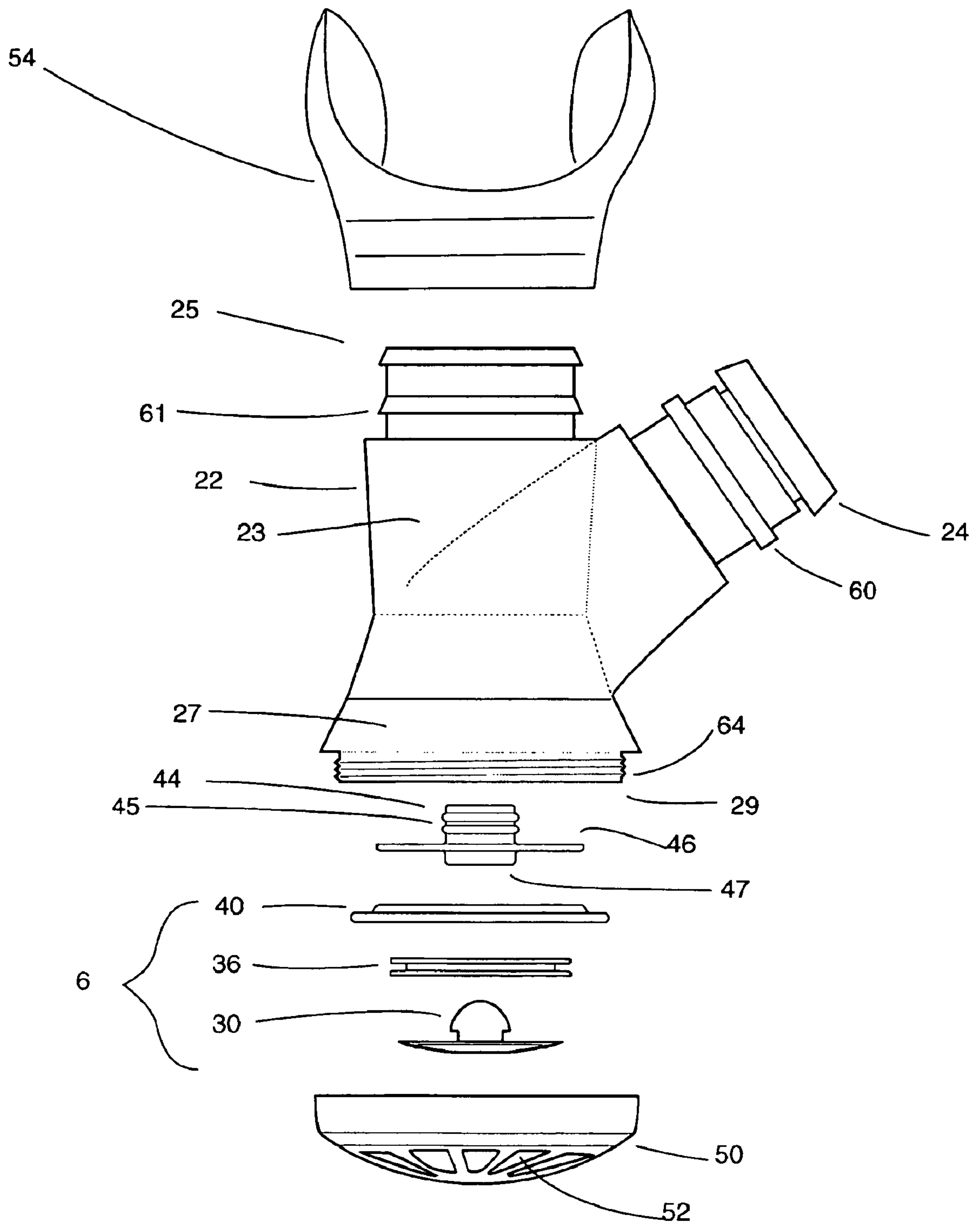
FIG. 5A is an exploded side view of the junction with the mouthpiece, the exploded exhalation valve/purge valve assembly, and the purge cap of the snorkel of FIGS. 1A and 1B.

FIG. 5A is an exploded side view of the unction junction 22 and its related structures. In particular, three mounts are integral to the junction 22 including the connecting tube mount 24 with its attachment ribs 60, the mouthpiece mount 25 with its attachment ribs 61, and the purge cap mount 29 with its external threads 64.

The junction 22 houses a small volume chamber 23, which receives inhaled air from the central channel 20 of the connecting tube 19 (shown in FIG. 4B), thereby becoming the fourth functional member of the inhalation conduit. In other embodiments, the chamber might not be a functional member of the inhalation conduit. This chamber 23 receives exhaled air from the mouthpiece 54. This chamber 23 is pressurized during exhalation and functionally provides the counter pressure to the user's airways. The lower region of the chamber 23 is more specifically referred to as the purge reservoir 27, as any captured water accumulates here first.

The junction 22 also houses the functional exhalation valve and purge valve. In the preferred embodiment, these two valves share three structural elements which, taken together, are simply referred to as the combined sealing assembly 6. The structures of this assembly are depicted for the preferred embodiment in FIGS. 6A through 6C, while examples of alternative embodiments of the exhalation valve and the purge valve are shown separately in FIGS. 7 and 8.

Figure 6A:
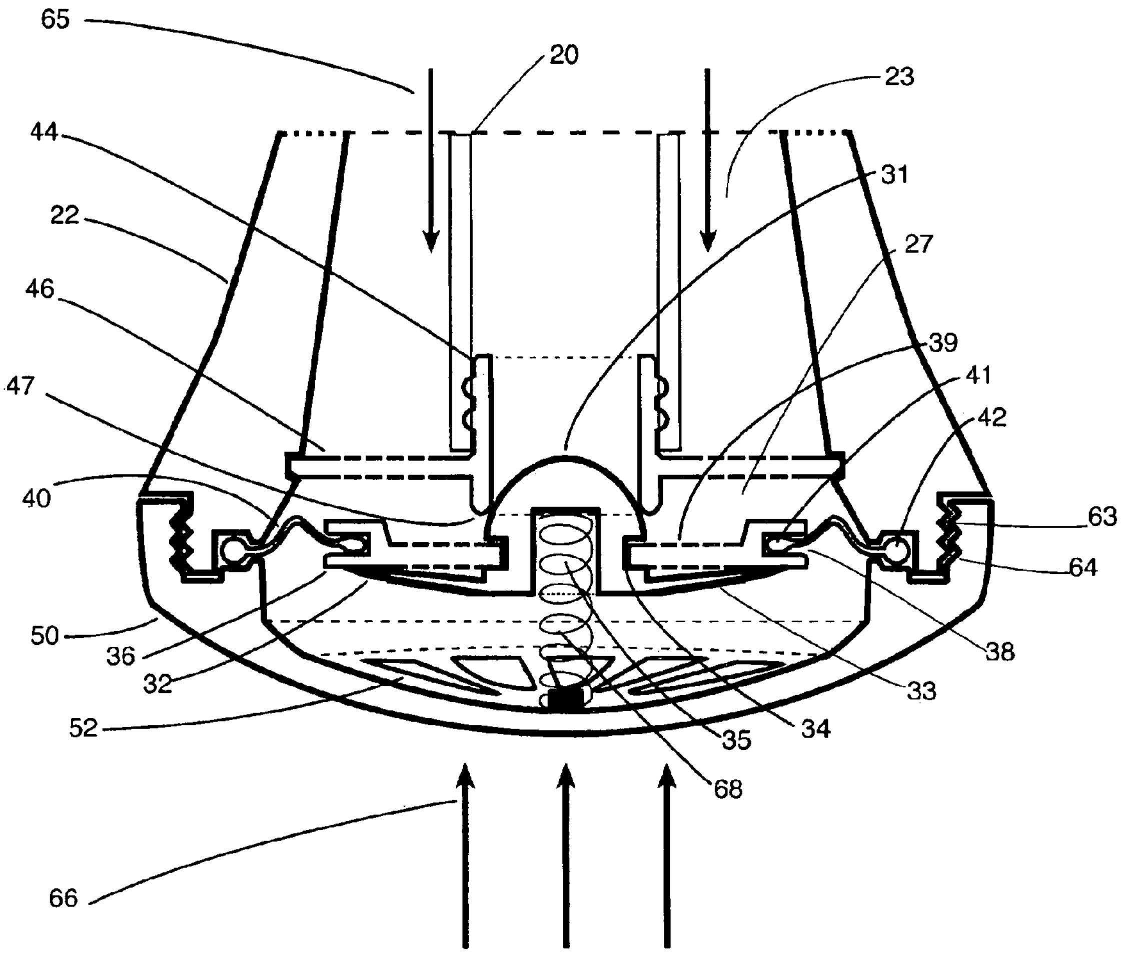
FIG. 6A is a transverse sectional view of the junction with the exhalation valve in closed position.
Figure 6B:
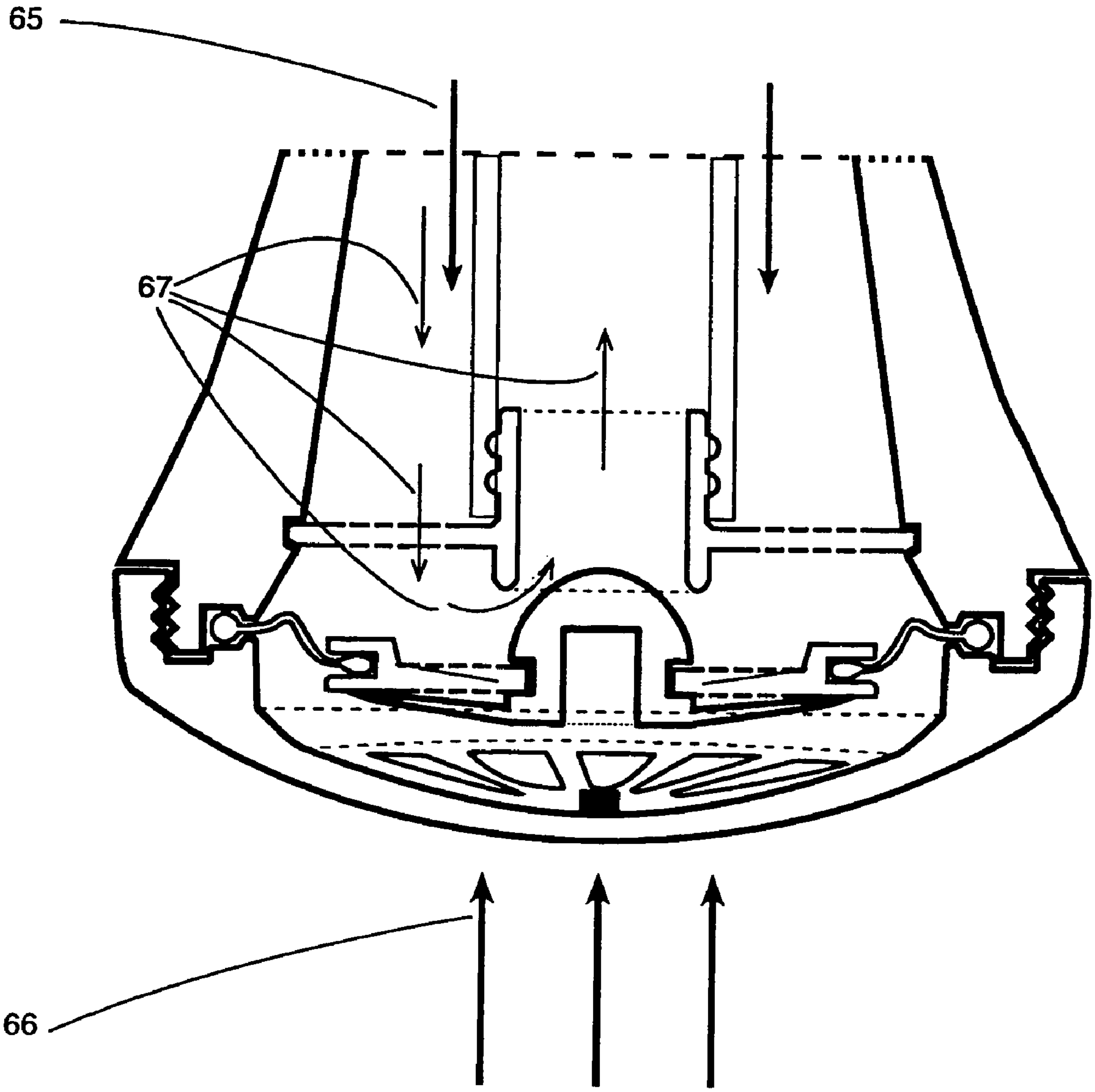
FIG. 6B is a transverse sectional view of the junction with the exhalation valve in open position as occurs in normal exhalation.
Figure 6C:
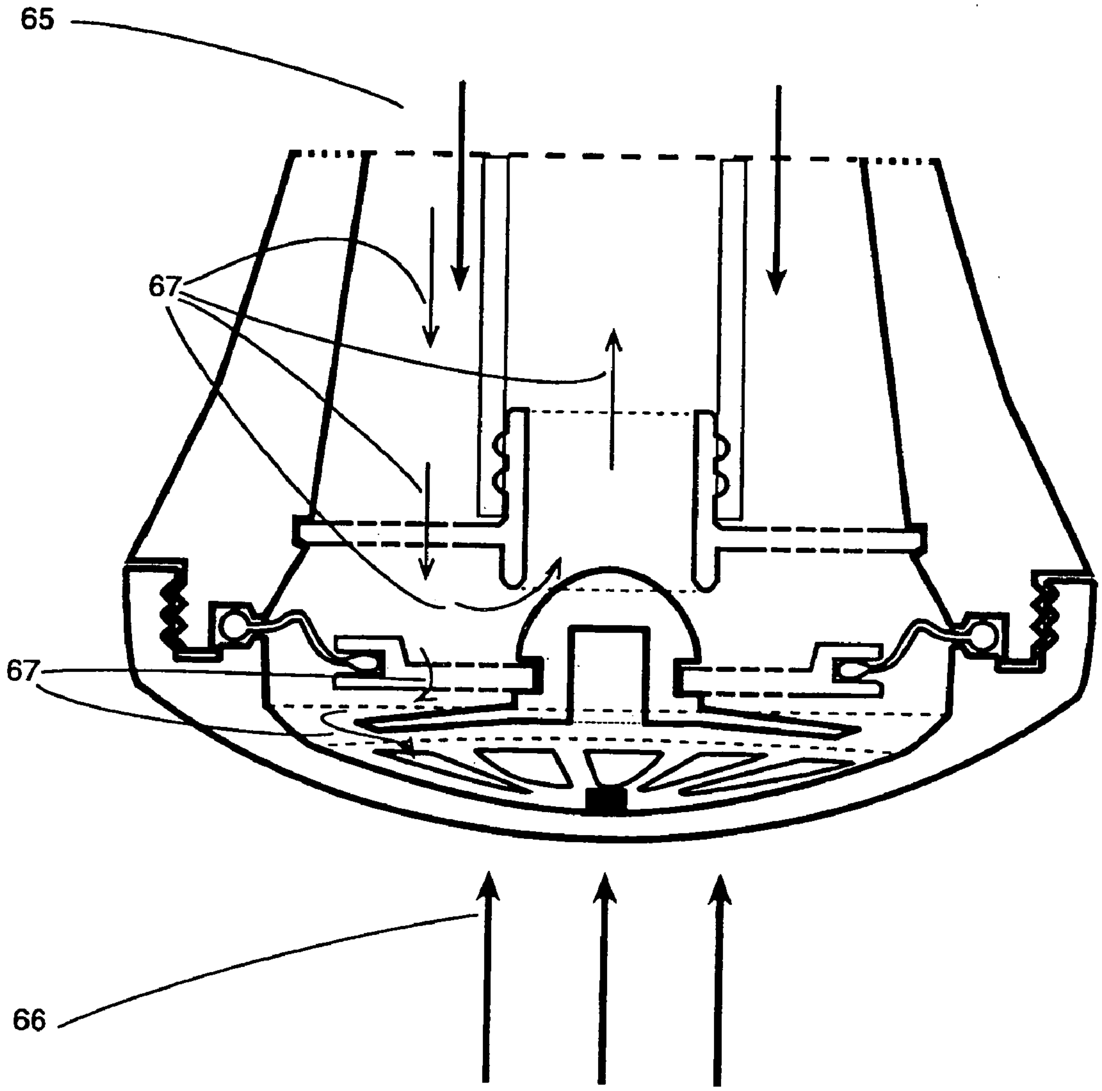
FIG. 6C is a sectional view of the junction with the rapid purge ports open as occurs during purging levels of exhalation.

The exhalation tube lower mount 44 is statically attached, via its spoke and rim-like supporting structure 46, to the junction 22 at the junction's snap mount for exhalation tube lower mount 44 (which is shown in FIGS. 6A, 6B, and 6C). The exhalation tube lower mount 44 additionally provides the sealing ring 47 for the exhalation valve. Inasmuch as this exhalation tube lower mount 44 directs exhaled air from the chamber 23 to the exhalation tube 48 (also referred to as exhalation conduit 48). The exhalation valve is comprised of elements of the combined sealing assembly 6 and the sealing ring 47, which items are described in more detail in FIGS. 6A, 6B, and 6C.

Figure 5B:
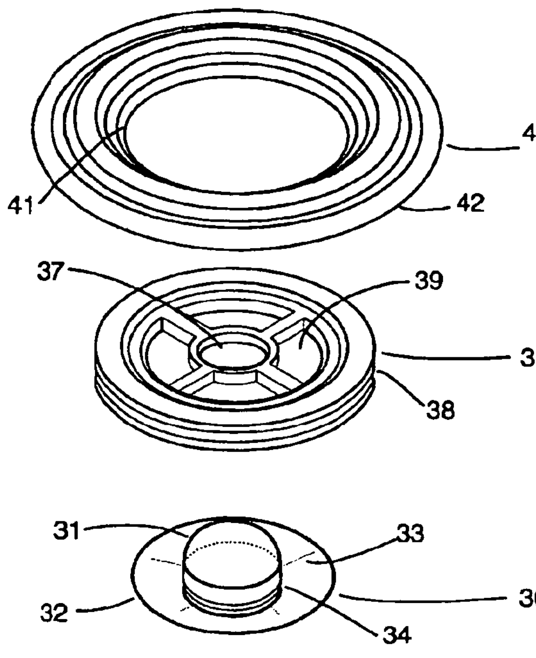
FIG. 5B is an exploded perspective view of the exhalation valve/purge valve assembly.

FIG. 5A also shows the purge cap 50 which screws onto the junction 22 at the corresponding mount. The purge cap 50 also is shown with the purge cap perforations 52 which allow water pressure to act on the exhalation valve and provides an exit for water that is purged across the purge valve. FIG. 5B is an exploded perspective view of the combined sealing assembly 6. This assembly comprises the silicon rubber combined sealing member 30, the rigid support disk 36, and the flexible convoluted membrane 40.

The combined sealing member 30, which is a one-part structure, provides the exhalation valve sealing member 31 and the purge valve sealing member 32. In the preferred embodiment, the exhalation valve sealing member 31 is dome-shaped in order to very gradually open exit flow and reduce vibration as exhaled air escapes across the exhalation valve when just minimally open. Other shapes that could similarly result in dampening include teardrop or cone. The contiguous purge valve sealing member 32 notably has dampening ribs 33 that project out radially in various lengths from the underside of the purge valve sealing member 32 and serves to reduce or eliminate the buzz that would otherwise occur while purging. The combined sealing member 30 also has an attachment groove 34 around its midsection that provides secure attachment to the rigid support disk 36. The hollow region 35 allows the combined sealing member 30 to be compressed for assembly purposes, and provides a recess mount for an optional spring 68 (FIG. 6A) that could further refine the exhalation airway pressure 65 if modification is desired in the future.

The rigid support disk 36 provides several functions: It supports the combined sealing member 30 that allows the exhalation valve sealing member 31 to form a stable seal with the sealing ring 47 (shown in FIG. 6A, FIG. 6B, and FIG. 6C); it provides a broad surface against which the ambient water pressure 66 (depicted in FIG. 6A, FIG. 6B, and FIG. 6C) acts to balance the desired exhalation airway pressure 65 (depicted in FIG. 6A, FIG. 6B, and FIG. 6C) within the snorkel 1; it supports the purge valve sealing member 32 to maintain proximity with the sealing surface of same disk; and it provides a smooth, rigid surface against which the purge valve sealing member 32 can seal. The rapid purge channels 39 in the rigid support disk 36 are closed by the purge valve sealing member 32, except during active purging operations when airway pressure 65 reaches a sufficient threshold for them to open for very rapid purge, taking full advantage of the higher exhalation airway pressures 65 which are maintained within the snorkel 1. The central hole 37 in the rigid support disk 36 supports the combined sealing member 30 at said member's attachment groove 34. The outer groove 38 of the rigid support disk 36 provides mounting attachment to the central anchor 41 of the flexible convoluted membrane 40.

The convoluted membrane 40 is a flexible, annular structure that has transverse sectional convolutions to allow axial travel of the rigid support disk 36 and the combined sealing member 30. This functionally allows the exhalation valve sealing member 31 to appropriately open and close its seal against the sealing ring 47 (shown in FIG. 6A, FIG. 6B, and FIG. 6C), thereby utilizing the ambient water pressure 66 to modulate the user's immersed and submersed exhalation rates. The convoluted membrane 40 has a central anchor 41 for secure attachment to the rigid support disk 36 and a peripheral anchor 42 for secure mounting in the space defined by the convoluted membrane junction groove 28 (of the junction 22 described separately in FIG. 6A) and the corresponding convoluted membrane purge cap groove 51 (of the purge cap 50 described separately in FIG. 6A). The screw mount of the purge cap 50 onto the junction 22 slightly compresses this peripheral anchor 42, which beneficially creates a seal to prevent water from entering the snorkel 1, and helps to lock the threads of the purge cap mount 29.

Figure 5C:
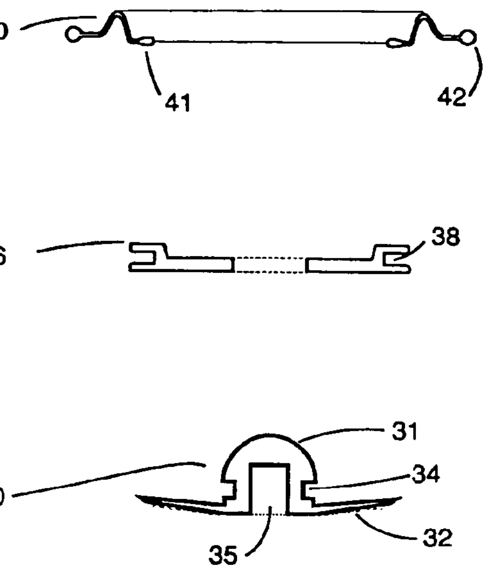
FIG. 5C is an exploded transverse sectional view of the exhalation valve/purge valve assembly.
Figure 5D:
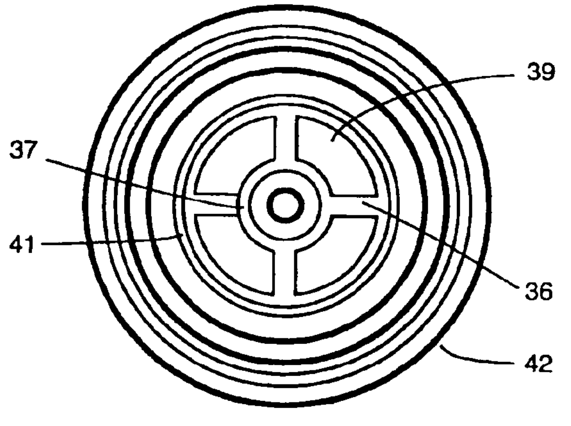
FIG. 5D shows the top view of this exhalation valve/purge valve assembly.
Figure 5E:
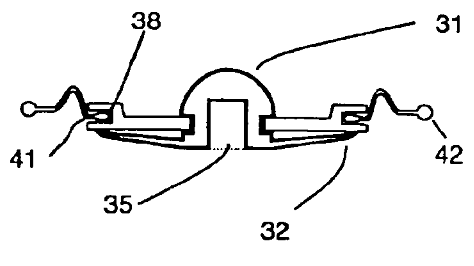
FIG. 5E shows a collapsed transverse sectional view of the exhalation valve/purge valve assembly.

FIG. 5C is a transverse sectional view of the parts shown in FIG. 5B. FIG. 5D is top view of the combined sealing assembly 6 as comprised by the parts of FIG. 5B. FIG. 5E is a transverse sectional view of the combined sealing assembly 6 as comprised by the parts of FIG. 5C.

FIG. 6A is a transverse sectional view of the junction 22 with the exhalation valve in closed position. Numerous items identified in this figure are described in detail in FIG. 5A and FIG. 5B. Of note, the user's airway pressure 65, which acts on the combined sealing assembly 6 from above, is inadequate to overcome the inward compressing force that the ambient water pressure 66 produces from below. Therefore, the exhalation valve sealing member 31 assumes tight closure against the sealing ring 47 and exhalation flow is prevented. The convoluted membrane 40 assumes a transverse sectional shape that is compatible with the rigid support disk 36 being at its upper end of axial travel. Also shown is an the optional mechanical spring 68 which could be used to further refine the counter pressure upon exhalation that is achieved.

FIG. 6B is a transverse sectional view of the junction 22 with the exhalation valve in open position. This figure is very similar to that of FIG. 5C, except that FIG. 5D depicts the condition of normal exhalation in which the user's airway pressure 65 exceeds ambient water pressure 66, thereby exerting a net downward force on the Combined sealing assembly 6, removing the exhalation valve sealing member 31 from its sealing position against the sealing ring 47. Flow arrows 67 depict the direction of airflow through the chamber 23, across the exhalation valve, and into the exhalation tube 48, from whence it is channeled to exit the snorkel 1. The convoluted membrane 40 assumes a transverse sectional shape that is compatible with the rigid support disk 36 being near its lower end of axial travel.

FIG. 6C is a transverse sectional view of the junction 22 with the purge valve in open position. Note that the exhalation valve is also in open position, because the airway pressure 65 required for purging is excessive for normal exhalation. As per FIG. 6A and FIG. 6B, the description of many items shown in this figure is deferred to their descriptions in FIG. 5A and FIG. 5B. Note that the purge valve sealing member 32 is separated from the rigid support disk 36, thereby allowing the contents of the snorkel 1 to be expelled through the rapid purge channels 39. The purge valve sealing member 32 has a bias for closure molded into its shape such that the airway pressure 65 must be distinctly greater than the ambient water pressure 66 in order for the purge valve sealing member 32 to become displaced form the rigid support disk 36. The convoluted membrane 40 assumes a transverse sectional shape that is compatible with the rigid support disk 36 being at its lowest end of travel.

Figure 7A:
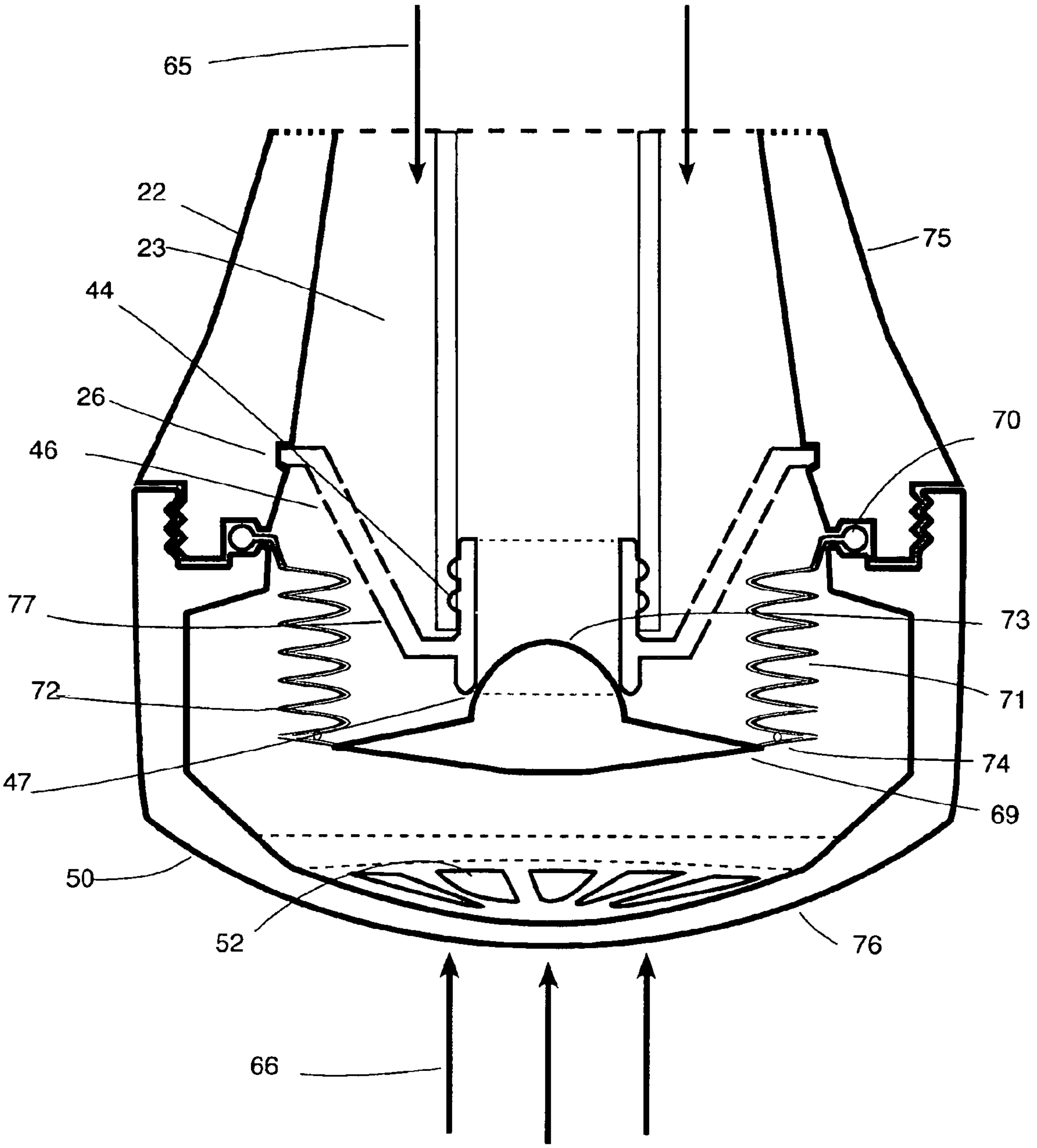
FIG. 7A is a sectional view of an alternative exhalation valve/purge valve apparatus showing a compressible accordion-style wall. This wall has slits in the lower, outer accordion walls that are closed, unless the walls are fully distended as in a purge operation.

FIG. 7A is a sectional view of an alternative embodiment of the snorkel 1 that replaces the three parts of the combined sealing assembly 6 with one single molded flexible rubber part, the flexible sealing member 69. In doing so, the junction 75, the purge cap 76, and the exhalation tube lower mount 77 are all modified for this alternative embodiment. This flexible sealing member 69 has a sealing member anchor 70 along its circumference that secures this member to the junction 75 and the purge cap 76 in similar fashion to the peripheral anchor 42 previously described for the preferred embodiment. The flexible sealing member 69 also has a sealing dome 73 component that provides the functionality of the exhalation valve sealing member 31 previously described for the preferred embodiment. The rigid support disk 36 of the preferred embodiment has been eliminated. An optional rigid ring 74 may be placed within the deeper folds of the accordion wall 71 for additional mechanical support. Purge operations are facilitated by a series of small purge slits 72 in the outer folds of accordion wall 71 which remain closed due to the molded shape of the wall and the compressive forces of ambient water, until the airway pressure 65 is adequate to fully distend the accordion wall 71, thereby opening these purge slits 72 in a fashion similar to duck bill valves.

Figure 7B:
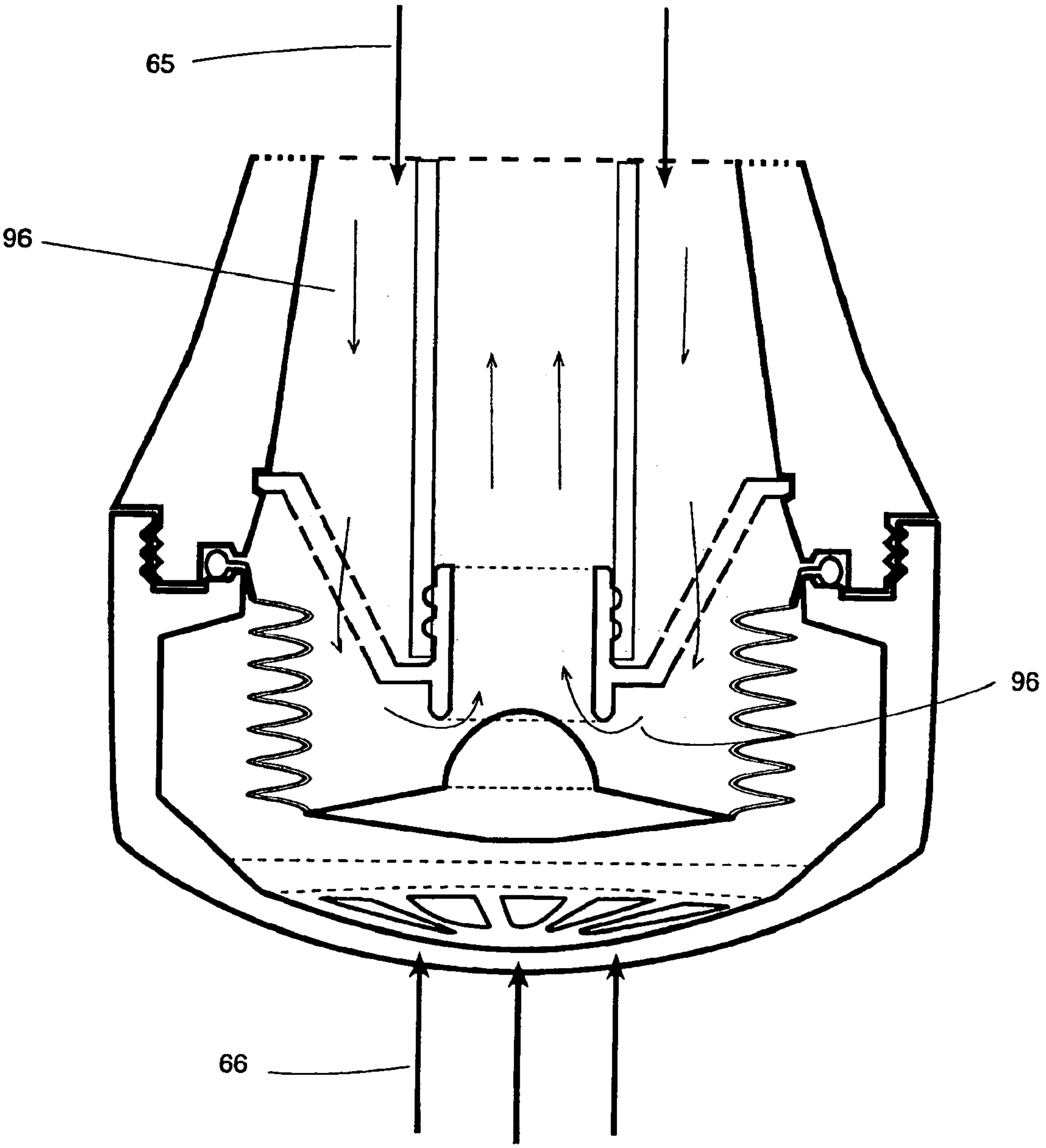
FIG. 7B is a sectional view similar to FIG. 7A showing the exhalation valve in open position with the purge valve in the closed position.

FIG. 7B is the alternative embodiment of FIG. 7A in a condition of normal exhalation as is the condition of the preferred embodiment in FIG. 6B, in which the airway pressure 65 is adequate for exhalation, but inadequate for rapid purge operation. The sealing dome 73 has separated from the exhalation tube sealing ring 47 allowing exhaled air to exit the snorkel 1 as shown by the flow arrows.

Figure 7C:
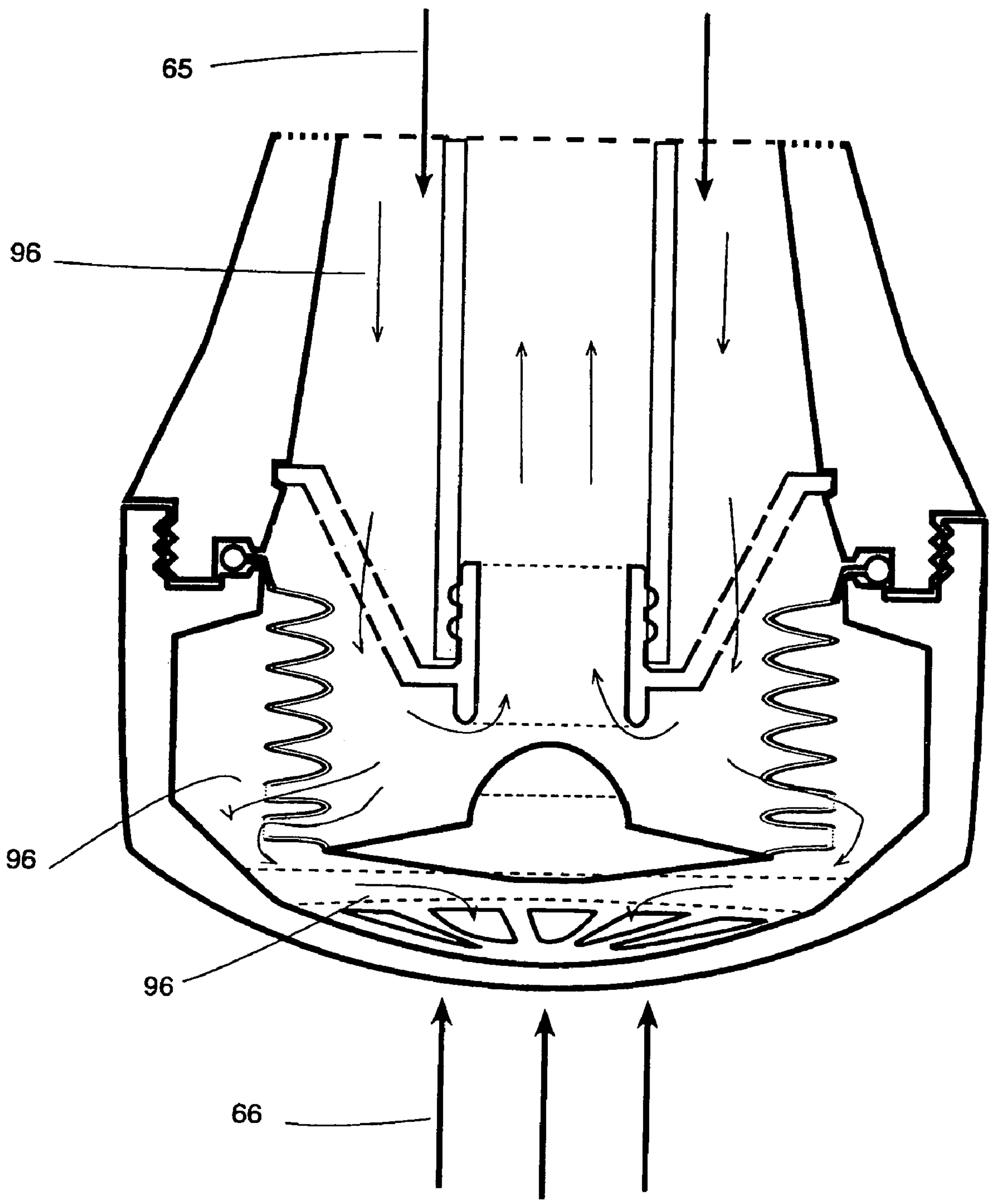
FIG. 7C is a sectional view similar to FIG. 7A showing both the exhalation valve and the purge valve open.

FIG. 7C is the alternative embodiment of FIG. 7A in a condition of purge operation as is the condition of the preferred embodiment in FIG. 6C, in which the airway pressure 65 is exceeds the threshold pressure for purging. Purge slits 72 are now evident in the lower, outer silicon rubber (or otherwise flexible) accordion wall 71. These purge slits 72 open with sufficient pressure to provide excellent purge capability, but otherwise generally remain closed for normal exhalation activities.

Figure 8:
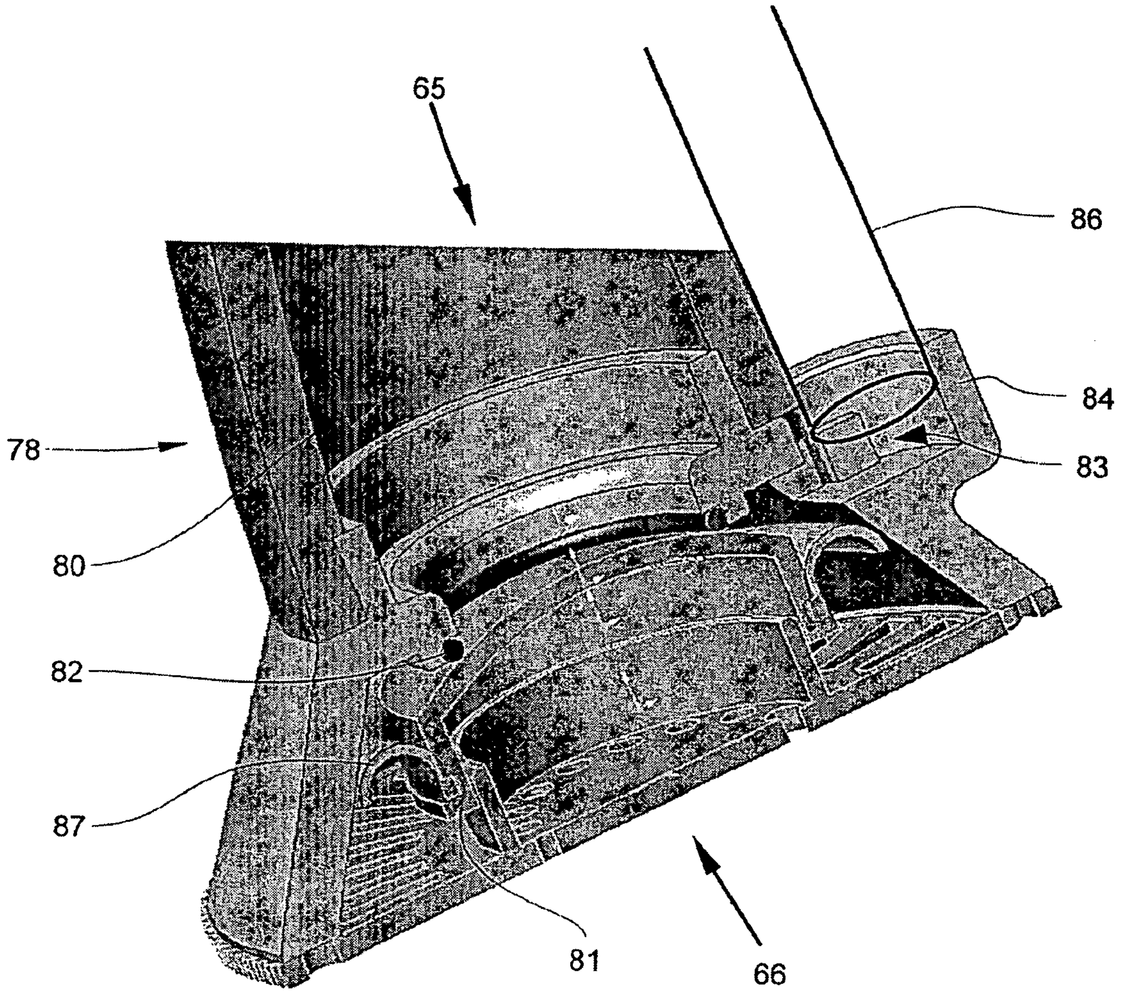
FIG. 8 is another cross-sectional view of an alternative exhalation valve/purge valve apparatus showing a dome that travels vertically and an externally positioned exhalation tube.

FIG. 8 reveals another embodiment of the snorkel 1 that now features a significantly modified design of the junction 78 that similarly contains a chamber 80 for counter pressure, but has an exhalation exit port 83 near the bottom of the snorkel 1, an external exhalation tube mount 84, and an external exhalation tube. The moving element which provides counter pressure for our desired positive end-expiratory pressure is the sealing cup 81 which travels coaxially and is supported laterally by a sealing cup rigid support. As the forces of airway pressure 65 in the chamber overcome the forces of ambient water pressure 66, the sealing cup 81 separates from the o-ring seal 82, allowing air to escape into the space above the perimeter of the sealing cup 81, which is then vented to the external exhalation tube 86 via the external exhalation tube mount 85. A sliding seal 87 helps maintain dryness within the snorkel.

Figure 9:
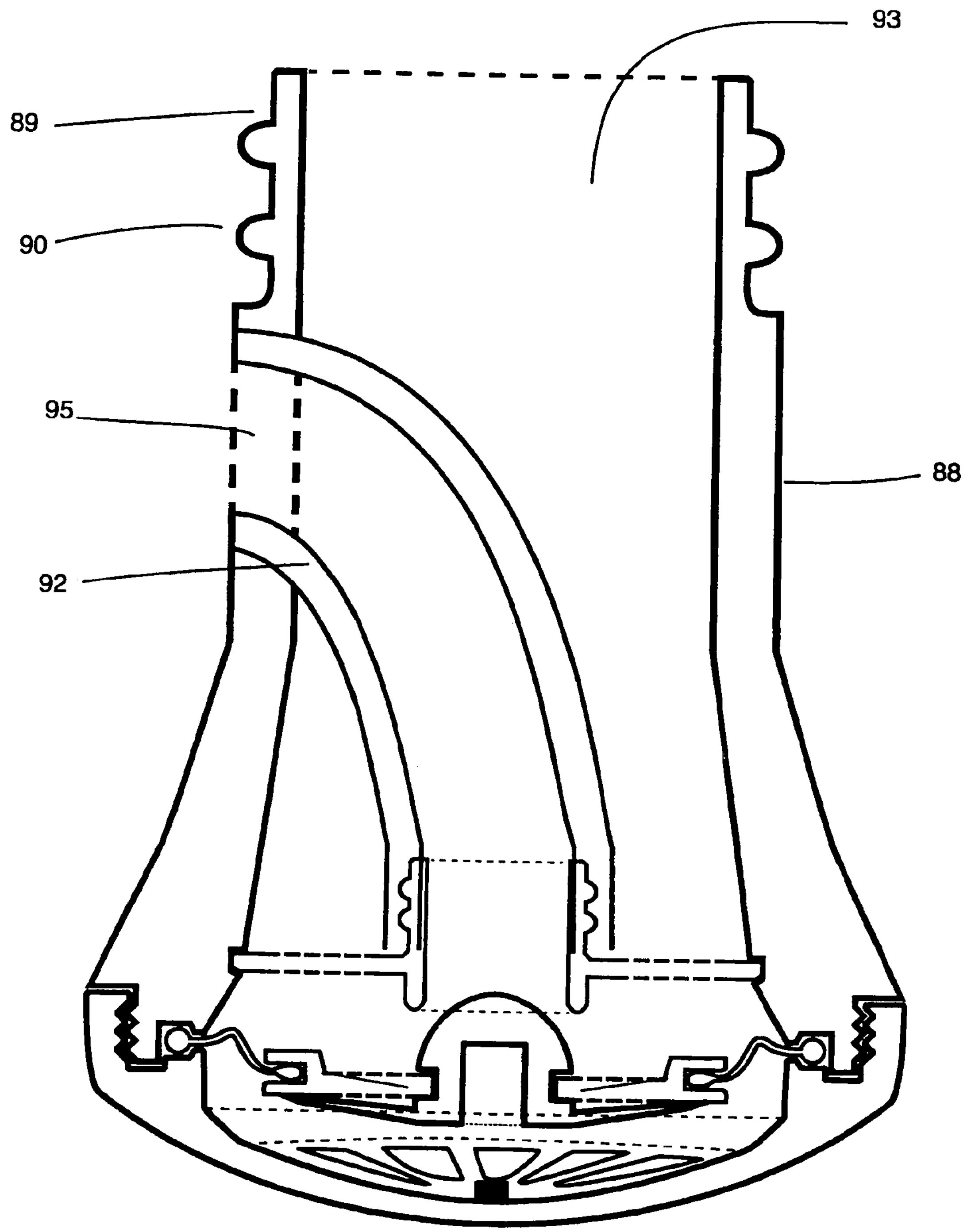
FIG. 9 is a transverse sectional view of the junction which houses the exhalation valve, as it is adapted to mount to a connecting tube, which in turn mounts to the exhalation vents or equivalent of a scuba regulator.

FIG. 9 is a transverse sectional view of the enclosing structures of the exhalation valve as is modified to attach, via a non-collapsible air tube, to the exhalation vent on a typical scuba regulator. This invention, in effect, becomes an "exhalation regulator" for scuba diving purposes, as it functions to regulate the exhalation rate of the scuba diver. The device may be worn at mouth or chest level, depending on the comfort of the user. The junction 88 has been shortened from the preferred embodiment (described in FIG. 5A thru 5D and FIG. 6A thru 6C) for this alternative embodiment as it may be adapted for scuba or snuba purposes. Furthermore, the mouthpiece mount 25 of the preferred snorkel 1 embodiment has been eliminated as this is not necessary for scuba. The exhalation vent from the separate scuba regulator attaches via a connecting tube to the ribbed 90 connecting tube mount 89. The exhalation tube 92 has been significantly shortened and the exhalation conduit exit port 95 has been moved to the junction 88. The chamber 93 importantly continues to serve as a counter pressure chamber to accomplish the improved exhalation pressures as described herein. FIG. 9 also includes a transverse sectional view of the exhalation valve and related structures as described in FIG. 6B and as adapted to mount to the exhalation vent on a scuba regulator or snuba equipment. The exhalation tube 48 of FIG. 9 is significantly shortened and exits from the junction 22 through a sidewall in the junction 22.

Figure 10A:
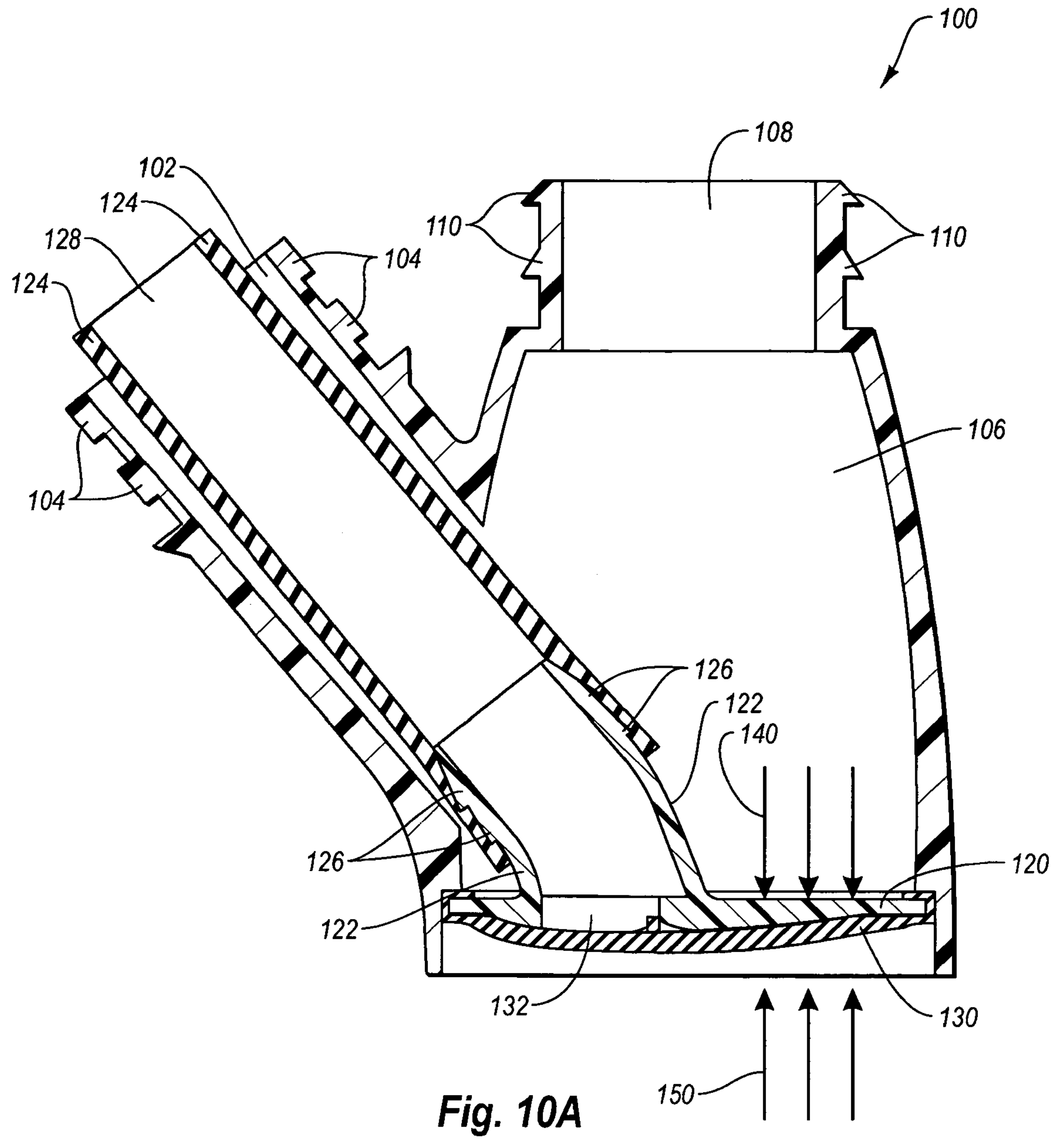
FIG. 10A is a sectional view of an alternative exhalation valve configuration in the closed position.
Figure 10B:
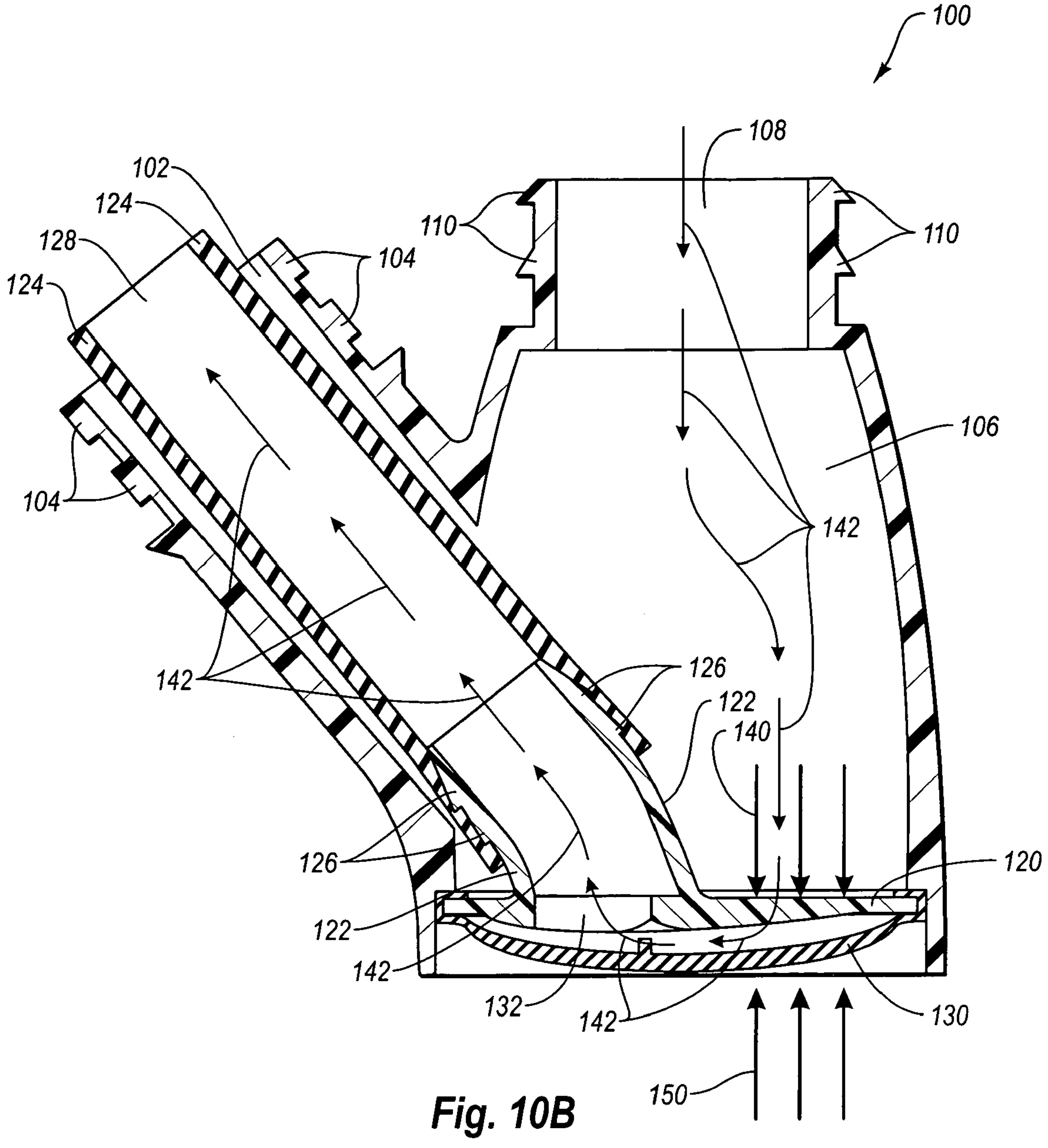
FIG. 10B is a sectional view of the exhalation valve configuration of FIG. 10A in the open position.

As disclosed in FIGS. 10A and 10B, a snorkel 100 includes an alternative exhalation valve configuration. The snorkel 100 is configured to include many of the same components as the snorkel 1 of FIGS. 1A and 1B, including an inhalation valve, a main tube, a connecting tube, and a mouthpiece. Although these components are not shown in FIGS. 10A and 10B, it is understood that snorkel 100 is configured to function with these components in place as disclosed in FIGS. 1A and 1B. The snorkel 100 includes an inhalation conduit 102. The outside of the inhalation conduit 102 includes ribs 104 to which a connecting tube and a main tube can be attached, as shown in FIGS. 1A and 1B. Air enters the inhalation tube through an inhalation valve that is a one-way valve which allows air to flow into the inhalation conduit 102 but not out of the inhalation conduit 102, as disclosed elsewhere herein. After air enters into the inhalation conduit 102 through the one-way inhalation valve, the air enters the chamber 106 and can subsequently be inhaled by a user through a first opening 108. A mouthpiece can be connected to the first opening 108 using ribs 110 to facilitate the inhalation and exhalation of air by the user. After air is inhaled through the first opening 108, the user can subsequently exhale air through the first opening 108 and back into the chamber 106. Since the inhalation valve through which air entered the inhalation conduit 102 is a one-way valve, air that is exhaled into the chamber can not exit the snorkel 100 through the inhalation conduit 102. Instead, the exhaled air builds up in the chamber 106 creating an exhalation pressure in the chamber 106.

The exemplary snorkel 100 also includes a valve plate 120 and a flexible membrane 120, which together form an exhalation valve. The valve plate 120 includes an exhalation port 132. As discussed above, the valve plate 120 may be substantially rigid and substantially disk-shaped. The valve plate 120 also includes two chamber ports 134, as illustrated in FIG. 11D. A flexible membrane 130 is attached to the edges of valve plate 120 and functions to seal the exhalation port 132 when the flexible membrane 130 is in the closed position, as disclosed in FIG. 10A.

As shown in FIGS. 10A and 10B, the snorkel 100 may include an inlet, such as the inhalation conduit 102, and the first opening 108. The snorkel may also include the valve plate 120 with the exhalation port 132 and chamber ports 134. The valve plate 120, exhalation port 132 and/or chamber ports 134 may form a second opening in the chamber 106. As shown in the accompanying figures, the inhalation conduit 102 may be sized and configured to allow air to flow into chamber 106, and the inlet may be separate and distinct from the first opening 108 in the chamber and the second opening in the chamber.

The chamber ports 134 are positioned opposite the exhalation port 132. In this context and in the claims, the phrase "the at least one chamber port being positioned opposite the exhalation port" is defined as the exhalation port being positioned on substantially one side of the valve plate 120, and the at least one chamber port being positioned on substantially the other side of the valve plate 120. Continuing with this definition, although this definition includes a situation, such as shown in FIGS. 11D and 13D, where there is some overlap of the chamber ports with the exhalation port, such that the chamber ports partially surround the exhalation port, this definition does not include a situation where the chamber ports surround or substantially surround the exhalation port, such as is shown in rigid support disk 36 of FIGS. 5B and 5D. This definition allows the flexible membrane 130 to gradually peel away from the valve plate 120 beginning on the side of the flexible membrane 130 that is positioned directly underneath the chamber ports.

Also disclosed in FIGS. 10A and 10B is an exhalation conduit lower mount 122 which forms part of an exhalation conduit 128. An exhalation tube 124 attaches to the exhalation conduit lower mount 122 at ribs 126.

When the snorkel 100 is submerged in water, the ambient water pressure of the water surrounding the snorkel 100 pushes the flexible membrane 130 against the valve plate 120, thus sealing the exhalation port 132. When a user exhales into the chamber 106, the exhalation pressure that builds up inside the chamber 106 creates an opening force 140 which acts on the flexible membrane 130 through the chamber ports 134 of the valve plate 120. This opening force 140 biases the flexible membrane 130 in a first direction. At the same time, the ambient water pressure of the water surrounding the submerged snorkel 100 acts as a closing force 150 which biases the flexible membrane 130 in a second direction. The first direction of the opening force 140 is substantially opposite the second direction of the closing force 150.

As disclosed in FIG. 10A, when the closing force 150 is greater than or equal to the opening force 140, the flexible membrane 130 seals the exhalation port 132 such that substantially no air is released from the chamber 106 through the exhalation port 132. As disclosed in FIG. 10B, however, when the opening force 140 exceeds the closing force 150, the flexible membrane 130 does not seal the exhalation port 132 and exhaled air 142 is released from the chamber 106 into the exhalation conduit 128. Once the exhaled air 142 reaches the exhalation conduit 128, the exhaled air 142 is released from the snorkel 100.

Figure 11A:
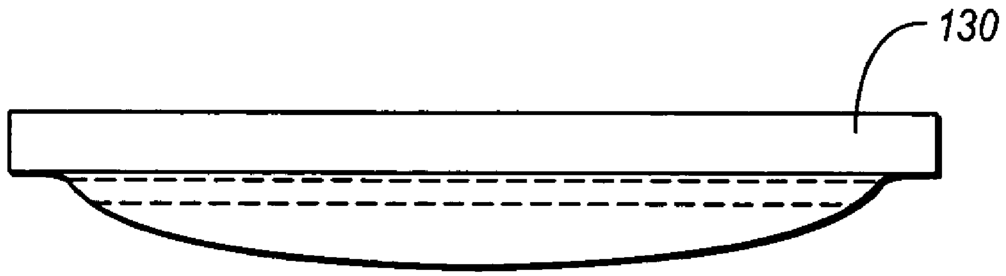
FIG. 11A is a side view of a flexible membrane that can be used in the exhalation valve configuration of FIG. 10A.
Figure 11B:
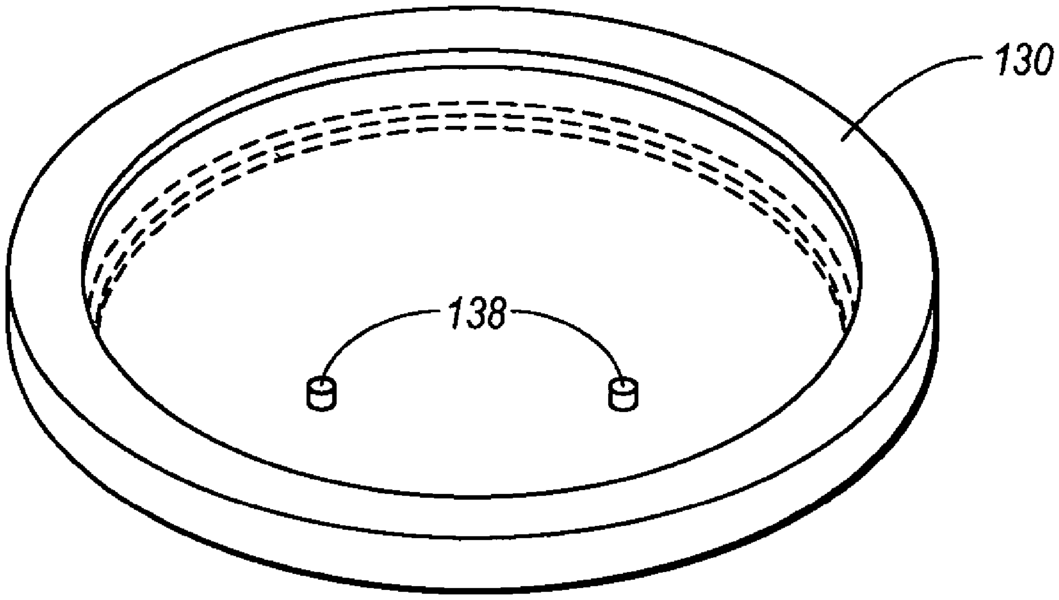
FIG. 11B is a perspective top view of the flexible membrane of FIG. 11A.
Figure 11C:
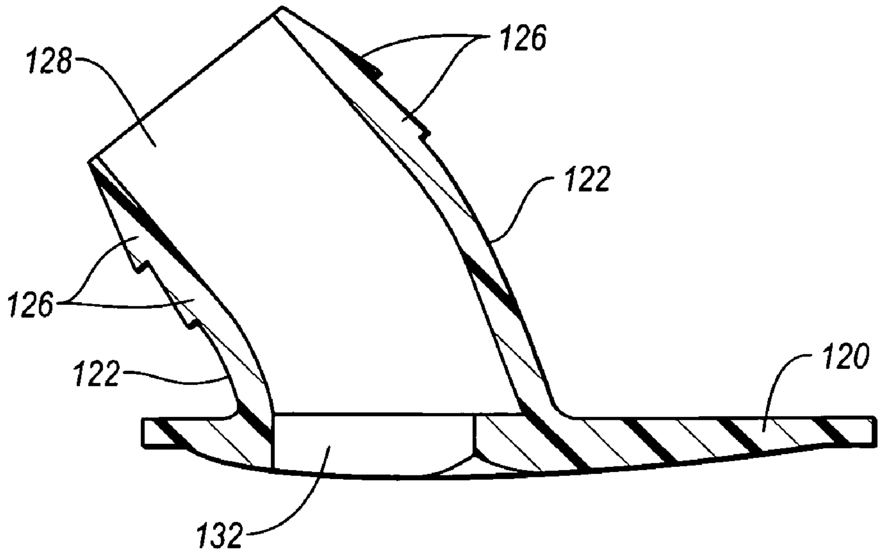
FIG. 11C is a cross-sectional side view of a disk-shaped rigid piece that can be used in the exhalation valve configuration of FIG. 10A.
Figure 11D:
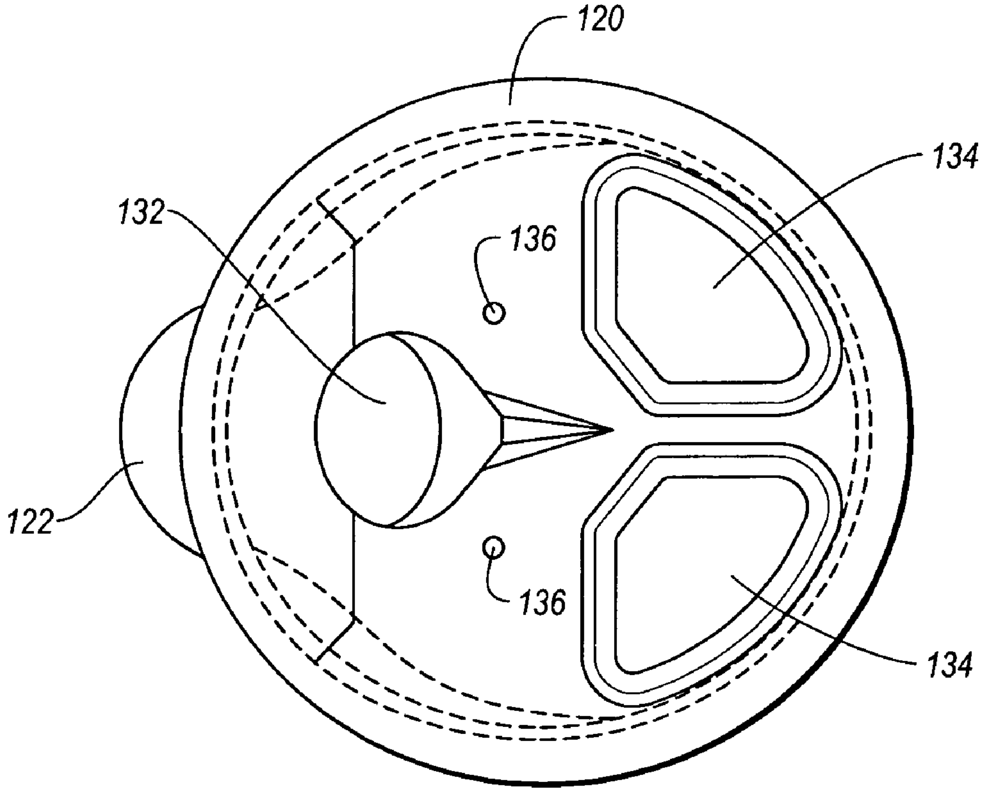
FIG. 11D is a bottom view of the disk-shaped rigid piece of FIG. 11C.

As disclosed in FIGS. 11A and 11B, the flexible membrane 130 can optionally include protrusions 138 which are integrally formed in the flexible membrane 130 and serve to dampen the impact of the flexible membrane 130 closing against the valve plate 134 to decrease the noise that can be involved with the closing of the flexible membrane 130 against the valve plate 120. As disclosed in FIGS. 11C and 11D, the valve plate 120 can also optionally include protrusions 136 which are integrally formed in the valve plate 120 and have substantially the same function as the protrusions 138. The exhalation port 132 of the valve plate 120 can also optionally be formed in a teardrop shape in order to allow the size of the unsealed portion of the exhalation port 132 to initially be very small and to gradually grow larger as the flexible membrane 130 peels away from the valve plate 120. FIG. 11D discloses two chamber ports 134 defined in the valve plate 120, only one chamber port is possible, as is more than two chamber ports.

Figure 12A:
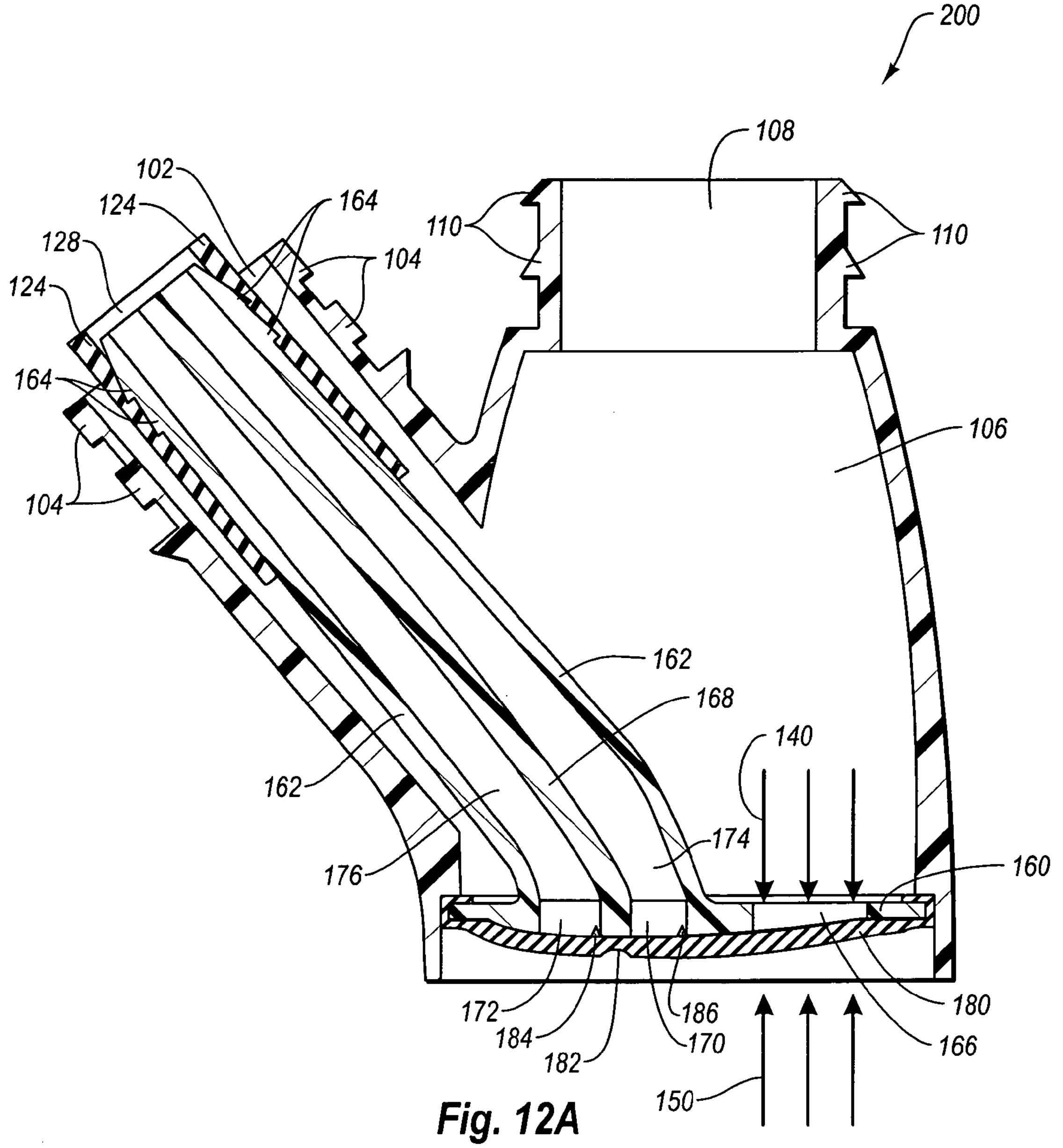
FIG. 12A is a sectional view of another alternative exhalation valve configuration with the valve in the closed position.
Figure 12B:
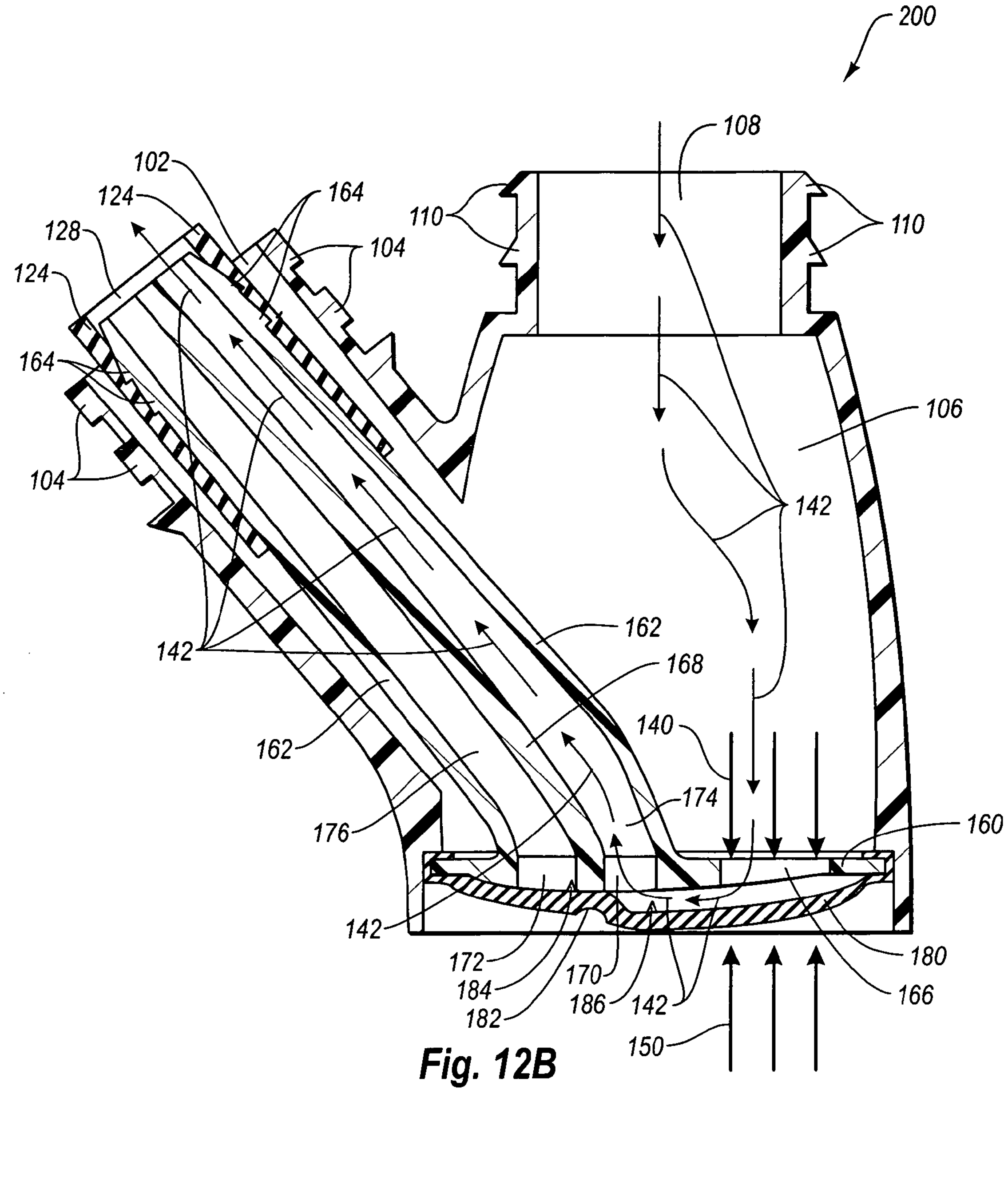
FIG. 12B is a sectional view of the exhalation valve configuration of FIG. 12A with the valve in a partially open position.
Figure 12C:
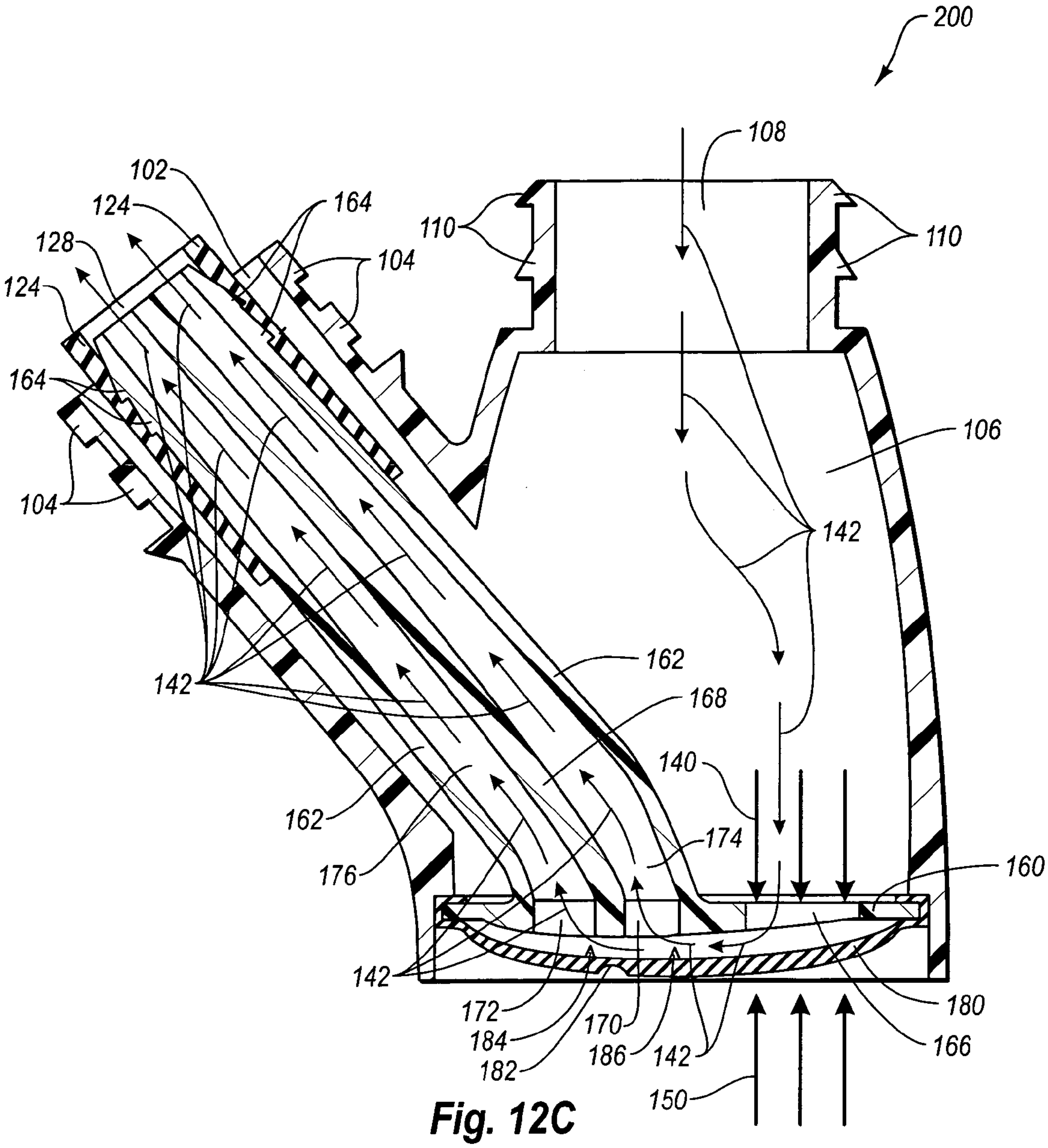
FIG. 12C is a sectional view of the exhalation valve of FIG. 12A with the valve in a fully open position.

As disclosed in FIG. 12A-12C, a snorkel 200 includes another alternative exhalation valve configuration. The snorkel 200 is identical to the snorkel 100 of FIGS. 10A and 10B, except that the valve plate 120 and the flexible membrane 130 has been replaced with a different valve plate 160 and a different flexible membrane 180. The air flows through the snorkel 200 in a similar fashion as through snorkel 100, including the fact that exhaled air becomes trapped in chamber 106, thereby creating an exhalation pressure within chamber 106.

The exemplary snorkel 200 also includes a valve plate 160 and a flexible membrane 180, which together form an exhalation valve. The valve plate 160 includes an exhalation port that is divided into an overlying exhalation port 170 and an underlying exhalation port 172. The valve plate also includes three chamber ports 166, as illustrated in FIG. 13D. A flexible membrane 180 is attached to the edges of valve plate 160 and functions to seal the overlying exhalation port 170 and the underlying exhalation port 172 when the flexible membrane 180 is in the closed position, as disclosed in FIG. 12A. Also disclosed in FIGS. 12A and 12B is an exhalation conduit lower mount 162 which forms part of an exhalation conduit 128. The exhalation conduit lower mount 162 is divided by a septum 168 that creates an overlying conduit 174 corresponding to the overlying exhalation port 170 and an underlying conduit 176 corresponding to the underlying exhalation port 172. An exhalation tube 124 attaches to the exhalation conduit lower mount 162 at ribs 164. The underlying conduit 176 is sized and positioned such that, when the snorkel 200 is in use, any water that enters the exhalation conduit 128 tends to collect in the underlying conduit 176. Similarly, when water condenses along the inside surface of the exhalation conduit 128, it will tend to run down the inside surface and collect in the underlying conduit 176. The underlying conduit 176 functions, therefore, to trap water that enters the exhalation conduit 128.

When the snorkel 200 is submerged in water, the ambient water pressure of the water surrounding the snorkel 200 pushes the flexible membrane 180 against the valve plate 120, thus sealing the overlying exhalation port 170 and the underlying exhalation port 172. When a user exhales into the chamber 106, the exhalation pressure that builds up inside the chamber 106 creates an opening force 140 which acts on the flexible membrane 180 through the chamber ports 166 of the valve plate 160. This opening force 140 biases the flexible membrane 180 in a first direction. At the same time, the ambient water pressure of the water surrounding the submerged snorkel 200 acts as a closing force 150 which biases the flexible membrane 180 in a second direction. The first direction of the opening force 140 is substantially opposite the second direction of the closing force 150.

As disclosed in FIG. 12A, when the closing force 150 is greater than or equal to the opening force 140, the flexible membrane 180 seals the exhalation port 132 such that substantially no air is released from the chamber 106 through the exhalation port 132. As disclosed in FIG. 12B, however, when the opening force 140 exceeds the closing force 150, the flexible membrane 180 does not seal the overlying exhalation port 170 and the exhaled air 142 is released from the chamber 106 into the overlying conduit 174 of the exhalation conduit 128. Once the exhaled air 142 reaches the exhalation-conduit 128, the exhaled air 142 is released from the snorkel 200.

The flexible membrane 180 includes a hinged region 182. The hinged region 182 can be integrally formed in the flexible membrane 180 by making the hinged region 182 thinner than the surrounding regions of the flexible membrane 180. When assembled into snorkel 200, the hinged region 182 aligns with the septum 168 such that, when the flexible membrane 180 bends along the hinged region 182, as disclosed in FIG. 12B, the overlying conduit 174 can become unsealed while the underlying conduit 176 remains sealed. The opening force 140 required to bend the flexible membrane 180 at the hinged region 182 is less than the opening force 140 required to bend the flexible membrane 180 such that both the overlying exhalation port 170 and the underlying exhalation port 172 are unsealed, as disclosed in FIG. 12C.

This difference in the lesser opening force required to unseal the overlying exhalation port 170 and the greater opening force required to unseal the underlying exhalation port 172 allows a user of the snorkel 200 to exhale normally through the overlying exhalation port 170 without unsealing the underlying exhalation port 172. Since any water that enters the exhalation conduit 128 tends to collect in the underlying conduit 176, this aspect of the exhalation valve of the snorkel 200 allows a user to exhale with minimal liquid in the path of the exhaled air leaving the snorkel. This aspect of the exhalation valve also allows a user to periodically and intentionally exhale more forcefully than normal in order to cause the opening force 140 to be great enough to unseal both the overlying exhalation port 170 as well as the underlying exhalation port 172. When this occurs, any fluid trapped in the underlying conduit 176 will be forced up the exhalation conduit 128 and out of the snorkel 200 by the forcefully exhaled air, thereby clearing the exhalation conduit 128 of unwanted fluid.

Figure 13A:
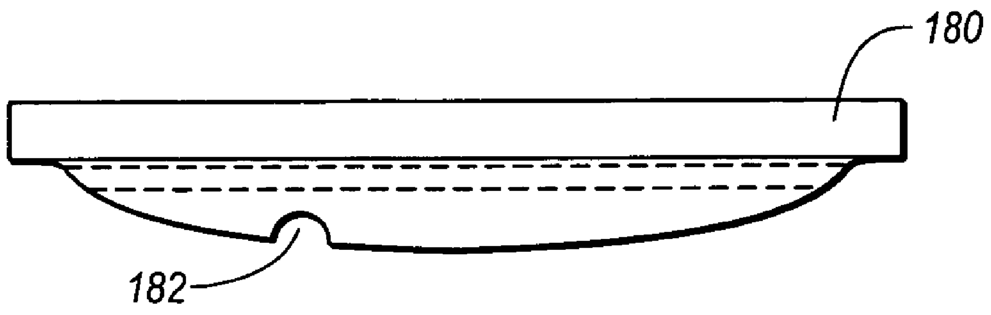
FIG. 13A is a side view of a flexible membrane that can be used in the exhalation valve configuration of FIG. 10A.
Figure 13B:
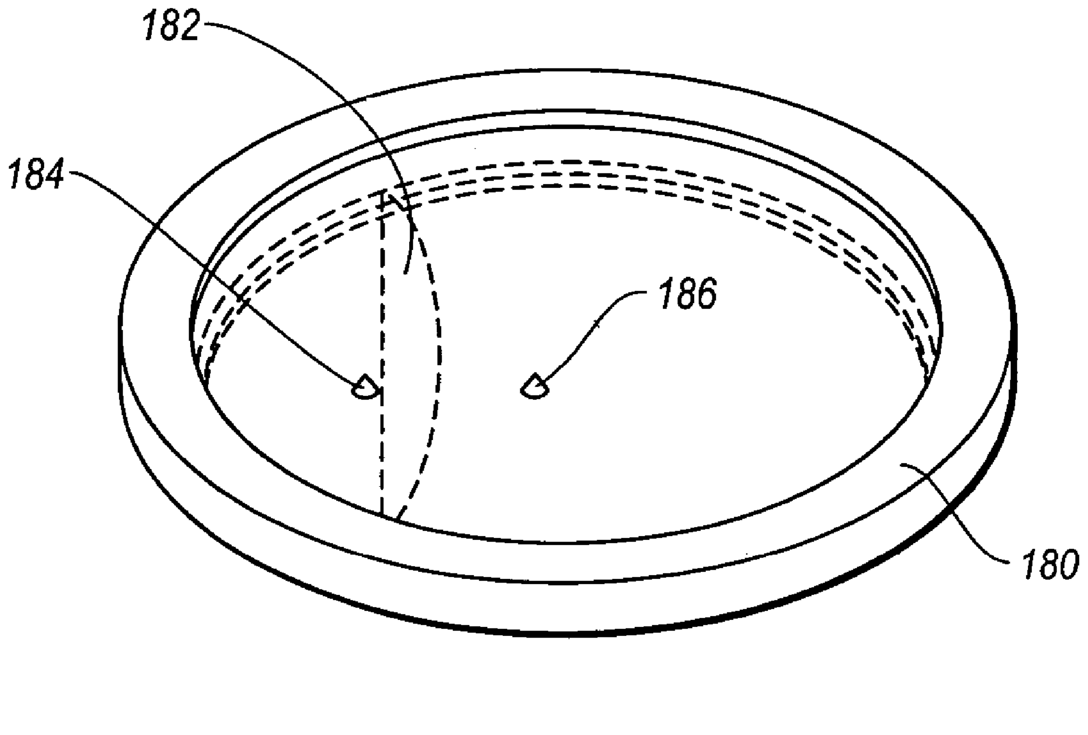
FIG. 13B is a perspective top view of the flexible membrane of FIG. 11A.

As disclosed both in FIGS. 12A-12C as well as in FIGS. 13A and 13B, the flexible membrane 180 can optionally include protrusions 184 and 186 which are integrally formed in the flexible membrane 180 and serve to dampen the impact of the flexible membrane 180 when closing against the valve plate 160. This dampening functions to decrease the noise that can be involved with the closing of the flexible membrane 180 against the valve plate 160. More particularly, the protrusion 184 is sized and configured to make contact with the septum 168 so that as the flexible membrane 180 closes and seals against the underlying exhalation port 172, the protrusion 184 absorbs the impact of the closing action by deforming slightly. This impact absorption results in less noise than without the presence of the protrusion 184. The protrusion 186 serves a similar function with respect to the inside wall of the overlying exhalation port 170.

Figure 13C:
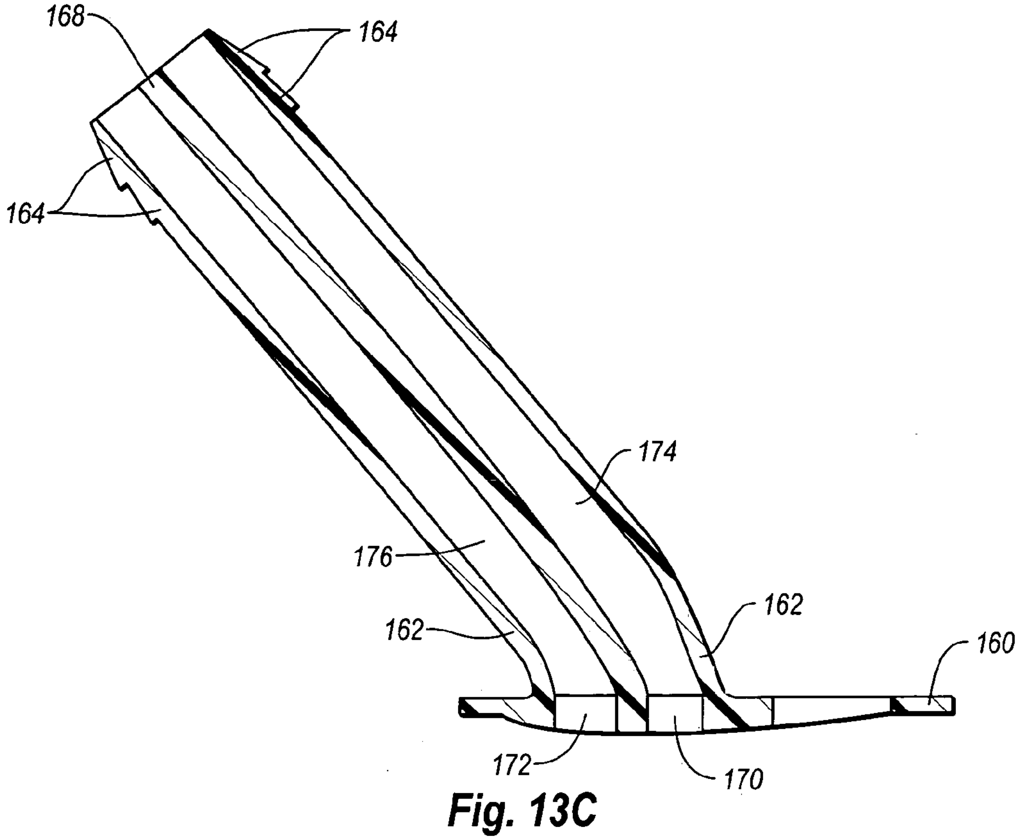
FIG. 13C is a cross-sectional side view of a disk-shaped rigid piece that can be used in the exhalation valve configuration of FIG. 10A.
Figure 13D:
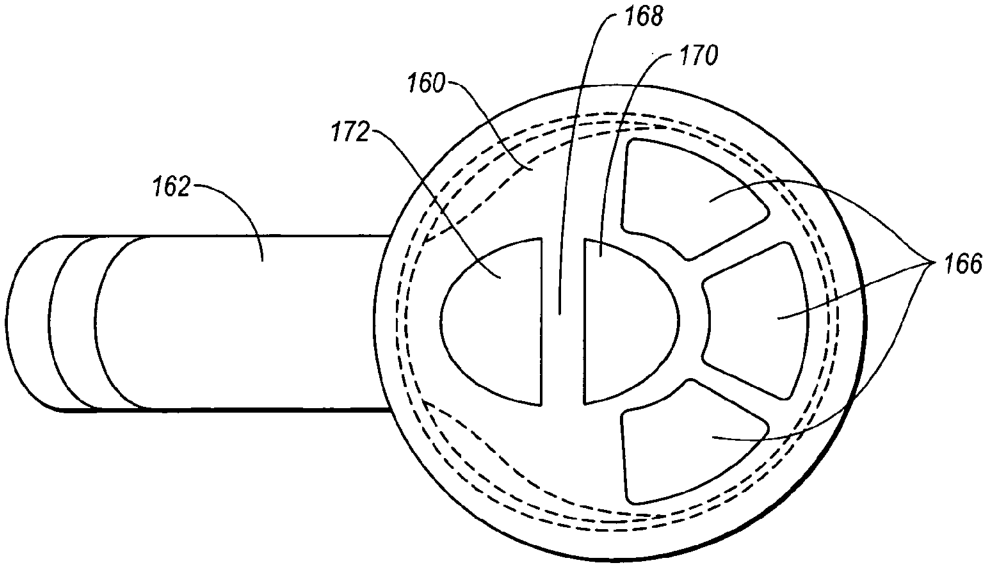
FIG. 13D is a bottom view of the disk-shaped rigid piece of FIG. 11C.

As disclosed in FIGS. 13C and 13D, the overlying exhalation port 170 and the underlying exhalation port 172 together form an oval shaped opening in the valve plate 160, although other shapes are possible. FIG. 11D discloses three chamber ports 166 defined in the valve plate 160. The function of chamber ports 166 could be served by a single chamber port or by more than two chamber ports.

Figure 14:
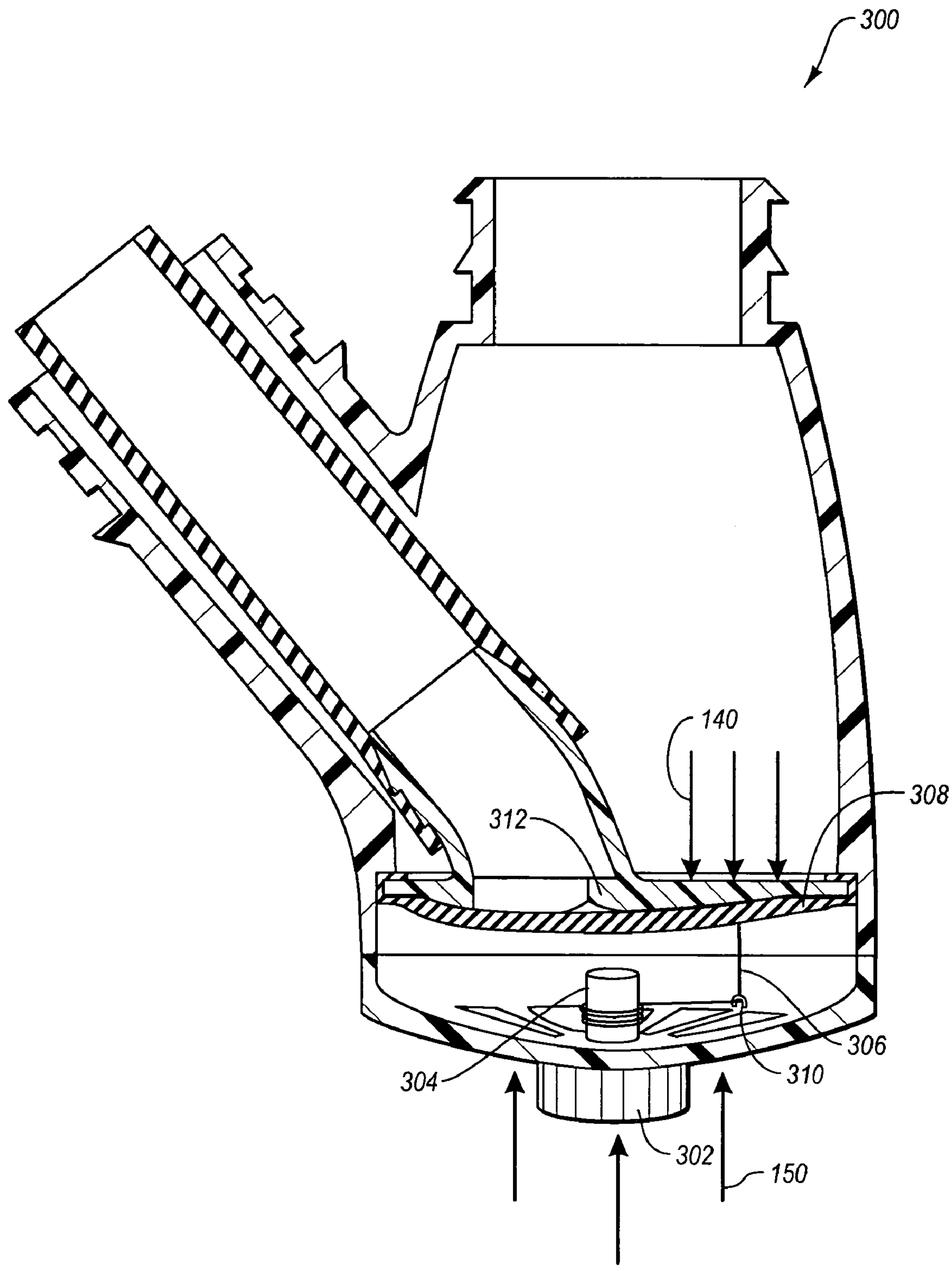
FIG. 14 is a cross sectional view of an exemplary tension knob.

As disclosed in FIG. 14, a snorkel 300 having an exhalation valve with an adjustable tension includes a knob 302 and a barrel 304 around which an elastic string 306 can be wound. The elastic string 306 is attached to a flexible membrane 308. The structure and function of flexible membrane 308 can be similar to the structure and function of the flexible membranes 130 and 180 of FIGS. 10A-13D, or similar to other flexible membranes disclosed herein. The elastic string 306 is held substantially perpendicular to the flexible membrane 308 by the sides of a hook 310.

As the knob 302 is turned one direction, the elastic string 306 winds around the barrel 304, thus creating tension of the elastic string 306. Since the elastic string 306 is attached to the flexible membrane 308, the tension of the elastic string 306 biases the flexible membrane 308 in substantially the same direction as the exhalation pressure within the snorkel 300, and thus contributes to the opening force 140 acting on the flexible membrane 308. Thus, as the tension on the elastic string 306 increases, the exhalation pressure that is required to unseal the flexible membrane 308 decreases. Conversely, as the knob 302 is turned in the opposite direction, the elastic string 306 unwinds from around the barrel 304, thus decreasing the tension of the elastic string 306 and the resulting force 140 acting on the flexible membrane 308. Thus, the snorkel 300 includes the knob 302 that allows a user to manually adjust the tension of the flexible membrane 308.

Although this invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. An exhalation valve for use in an underwater breathing device, the exhalation valve configured to produce positive end-expiratory pressure in the airway of a user of the underwater breathing device in order to reduce the overall work of underwater breathing, the exhalation valve comprising:
- a valve plate defining at least one chamber port and an exhalation port, the at least one chamber port being positioned opposite the exhalation port; and
- a flexible membrane that is sealable against a surface of the valve plate and is sized and positioned to be capable of sealing the exhalation port, the flexible membrane comprising:
  - a sealed position in which the flexible membrane seals the exhalation port such that substantially no air can flow between the at least one chamber port and the exhalation port; and
  - an unsealed position in which the flexible membrane does not seal the exhalation port such that air can flow between the at least one chamber port and the exhalation port;
- wherein the valve plate is substantially rigid and substantially disk-shaped.

2. The exhalation valve as recited in claim 1, wherein the exhalation valve controls the flow of air out of an opening in a chamber, the exhalation valve allowing air flow out of the chamber when an opening force on the valve is greater than a closing force on the valve;
- wherein the opening force on the valve is at least partially created by an exhalation pressure; and
- wherein the closing force on the valve is at least partially created by ambient water pressure when the exhalation valve is disposed in water.

3. The exhalation valve as recited in claim 1, wherein the exhalation port is one of oval-shaped or teardrop-shaped.

4. The exhalation valve as recited in claim 1, further comprising at least one protrusion positioned between the valve plate and the flexible membrane and formed on the valve plate and/or the flexible membrane.

5. An underwater breathing device configured to produce positive end-expiratory pressure in the airway of a user of the underwater breathing device in order to reduce the overall work of underwater breathing, the underwater breathing device comprising:

a chamber including first and second openings, the chamber being configured such that when air is being exhaled through the first opening into the chamber in a manner that restricts air from simultaneously escaping through the first opening, there is no unrestricted passageway out of the chamber through which air can exit the underwater breathing device and, as a result, the exhaled air creates an exhalation pressure within the chamber; and a valve for restricting airflow between the chamber and the second opening, the valve comprising:

a valve plate defining the at least one chamber port and the exhalation port, the at least one chamber port being positioned opposite the exhalation port, the at least one chamber port and the exhalation port defining the second opening; and a flexible membrane that is sealable against a surface of the valve plate and is sized and positioned to be capable of sealing the exhalation port, the flexible membrane being configured such that an opening force, comprising any exhalation pressure within the chamber, biases the valve in a first direction and a closing force biases the valve in a second direction, the first direction being substantially opposite the second direction, the flexible membrane comprising:

a closed position in which the flexible membrane seals the exhalation port such that substantially no air is released from the chamber through the exhalation port; the flexible membrane being disposed in the closed position when the opening force is less than or equal to the closing force; and an open position in which the flexible membrane does not seal the exhalation port such that air is released from the chamber through the exhalation port, the flexible membrane being disposed in the open position when the opening force exceeds the closing force.

6. The underwater breathing device as recited in claim 5, further comprising a mouthpiece connected to the first opening.

7. The underwater breathing device as recited in claim 5, further comprising an exhalation conduit connected to the exhalation port.

8. The underwater breathing device as recited in claim 5, wherein the closing force includes ambient water pressure when at least a portion of the underwater breathing device is submerged in water.

9. An underwater breathing device configured to produce positive end-expiratory pressure in the airway of a user of the underwater breathing device in order to reduce the overall work of underwater breathing, the underwater breathing device comprising:

a chamber including first and second openings, the chamber being configured such that when air is being exhaled through the first opening into the chamber in a manner that restricts air from simultaneously escaping through the first opening, there is no unrestricted passageway out of the chamber through which air can exit the underwater breathing device and, as a result, the exhaled air creates an exhalation pressure within the chamber;

a valve for restricting airflow between the chamber and the second opening, the valve being configured such that any exhalation pressure within the chamber biases the valve in a first direction and a counter pressure biases the valve in a second direction, the first direction being substantially opposite the second direction, the valve comprising:

a closed position in which substantially no air is released from the chamber through the second opening, the valve being disposed in the closed position when any exhalation pressure within the chamber is less than or equal to the counter pressure; and an open position in which at least some air is released from the chamber through the second opening, the valve being disposed in the open position when any exhalation pressure within the chamber exceeds the counter pressure; and an inlet that is sized and configured to allow air to flow into the chamber, the inlet being separate and distinct from the first opening in the chamber and the second opening in the chamber.

10. The underwater breathing device as recited in claim 9, further comprising a mouthpiece connected to the first opening.

11. The underwater breathing device as recited in claim 9, further comprising an exhalation conduit connected to the second opening.

12. The underwater breathing device as recited in claim 9, wherein the counter pressure comprises ambient water pressure when at least a portion of the underwater breathing device is submerged in water.

13. A breathing apparatus that is sized and configured to provide positive end expiratory pressure (PEEP) to a user, the breathing apparatus comprising:

a chamber that is sized and configured to receive air exhaled by a user, the air within the chamber having an exhalation pressure, the chamber comprising:

a first opening that is sized and configured to receive air exhaled by the user;

a second opening that is sized and configured to allow air to flow out of the chamber; and an inlet that is sized and configured to allow air to flow into the chamber, the inlet being separate and distinct from the first opening in the chamber and the second opening in the chamber; and an exhalation valve that controls the flow of air out of the chamber through the second opening, the exhalation valve allowing air flow out of the chamber when an opening force on the valve is greater than a closing force on the valve;

wherein the opening force on the valve is at least partially created by the exhalation pressure;

wherein the closing force on the valve is at least partially created by ambient water pressure when the exhalation valve is disposed in water.

14. The breathing apparatus as in claim 13, further comprising a flexible membrane that forms a portion of the exhalation valve, the flexible membrane including a first portion that moves in response to a first exhalation pressure and a second portion that move in response to a second exhalation pressure, the second exhalation pressure being greater than the first exhalation pressure.

15. The breathing apparatus as in claim 13, further comprising an inhalation conduit connected to the inlet and an inhalation valve that allows air to flow into the chamber and at least substantially prevents air from flowing out of the chamber through the inhalation conduit.

16. The breathing apparatus as in claim 13, wherein the exhalation valve further comprises a membrane that is movable between an open position in which air can flow through the second opening in the chamber and a closed position in which air flow through the second opening in the chamber is at least substantially prevented.

17. The breathing apparatus as in claim 16, wherein the opening force is applied to a first side of the membrane and the closing force is applied to a second side of the membrane.

18. The breathing apparatus as in claim 16, wherein the membrane includes one or more protrusions that are integrally formed with the membrane as part of a unitary, one-piece structure.

19. The breathing apparatus as in claim 16, wherein the membrane includes a hinge portion that is sized and configured to facilitate bending of the membrane.

20. The breathing apparatus as in claim 16, wherein the membrane includes an outer perimeter that is at least substantially secured in a fixed position relative to the exhalation valve and the membrane includes an inner portion that is movable between the open position and the closed position.

21. The breathing apparatus as in claim 13, wherein the breathing apparatus is part of a snorkel.

22. The breathing apparatus as in claim 13, wherein the breathing apparatus is part of a breathing regulator.

23. The breathing apparatus as in claim 13, wherein the breathing apparatus is used in connection with scuba equipment.

24. The breathing apparatus as in claim 13, wherein the exhalation valve further comprises:

one or more apertures in fluid communication with the second opening in the chamber; and a membrane that is movable between an open position in which air can flow through one or more of the apertures and a closed position in which air flow through the one or more apertures is at least substantially prevented.

25. The breathing apparatus as in claim 13, wherein the exhalation valve further comprises:

a valve plate;

one or more apertures in the valve plate; and a membrane that is movable between an open position in which air can flow through one or more of the apertures in the valve plate and a closed position in which air flow through the one or more apertures in the valve plate is at least substantially prevented.

26. The breathing apparatus as in claim 13, wherein the exhalation valve further comprises:

a valve plate;

a first set of one or more apertures in the valve plate;

a second set of one or more apertures in the valve plate; and a membrane that is movable between an open position in which air can flow through one or more of the second set of apertures in the valve plate and a closed position in which air flow through the one or more of the second set of apertures in the valve plate is at least substantially prevented.

27. The breathing apparatus as in claim 13, further comprising an inhalation conduit that is sized and configured to allow air to flow into the chamber; and further comprising an exhalation conduit in fluid communication with the exhalation valve, the exhalation conduit being at least substantially disposed within the inhalation conduit.

28. The breathing apparatus as in claim 13, wherein the exhalation valve is at least substantially disposed within the second opening of the chamber, the exhalation valve comprising:

a rigid portion including one or more apertures;

a flexible member that is sized and configured to control the flow of air through apertures in the rigid portion; and an exhalation conduit that allows air flowing through the apertures to exit the breathing apparatus, the exhalation conduit including a first passageway that is separate and distinct from a second passageway.

* * * * *